United States Patent
Li et al.

(10) Patent No.: US 12,192,833 B2
(45) Date of Patent: Jan. 7, 2025

(54) MOBILITY MANAGEMENT METHOD FOR LOW OVERHEAD STATE

(71) Applicant: HUAWEI TECHNOLOGIES CO., LTD., Guangdong (CN)

(72) Inventors: Bingzhao Li, Beijing (CN); Wei Quan, Beijing (CN); Jian Zhang, Shenzhen (CN); Weihua Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/527,153

(22) Filed: Nov. 15, 2021

(65) Prior Publication Data
US 2022/0078673 A1  Mar. 10, 2022

Related U.S. Application Data

(63) Continuation of application No. 16/023,856, filed on Jun. 29, 2018, now Pat. No. 11,178,583, which is a (Continued)

(30) Foreign Application Priority Data

Dec. 31, 2015 (WO) ................ PCT/CN2015/110336
Mar. 31, 2016 (WO) ................ PCT/CN2016/078165

(51) Int. Cl.
*H04W 36/00* (2009.01)
*H04W 48/10* (2009.01)
(Continued)

(52) U.S. Cl.
CPC ....... *H04W 36/0033* (2013.01); *H04W 48/10* (2013.01); *H04W 52/0209* (2013.01);
(Continued)

(58) Field of Classification Search
CPC . H04W 36/0033; H04W 76/20; H04W 76/27; H04W 48/10; H04W 52/0209;
(Continued)

(56) References Cited

U.S. PATENT DOCUMENTS 9,253,705 B1    2/2016  Pawar et al.
2005/0124344 A1  6/2005  Laroia et al.
(Continued)

FOREIGN PATENT DOCUMENTS

CN    101626565 A    1/2010
CN    101662487 A    3/2010
(Continued)

OTHER PUBLICATIONS

Mediatek Inc. (Session Chair), Report of the LTE breakout session (NB-IoT) 3GPP TSG-RAN WG2 Meeting #92, Anaheim, USA, Nov. 16 20, 2015, R2-157014, 18 pages.
(Continued)

*Primary Examiner* — Ian N Moore
*Assistant Examiner* — Latresa A McCallum

(57) ABSTRACT

Embodiments of the present invention disclose a mobility management method, user equipment, and a base station. The mobility management method may include: receiving, by the user equipment (UE) in a connected state, a source identifier of the UE from a first base station, where the source identifier is used to uniquely identify the UE in the first base station; entering, by the UE, a low-overhead state after satisfying a low-overhead activation condition; storing, by the UE in the low-overhead state, a connection context of the UE in the connected state, and camping on a cell according to a cell reselection criterion in a moving process.

16 Claims, 10 Drawing Sheets

Related U.S. Application Data continuation of application No. PCT/CN2016/104700, filed on Nov. 4, 2016.

(51) Int. Cl.
  *H04W 52/02* (2009.01)
  *H04W 76/20* (2018.01)
  *H04W 76/27* (2018.01)
  *H04W 76/19* (2018.01)

(52) U.S. Cl.
  CPC .......... *H04W 76/20* (2018.02); *H04W 76/27* (2018.02); *H04W 36/0061* (2013.01); *H04W 76/19* (2018.02)

(58) Field of Classification Search
  CPC . H04W 76/19; H04W 36/0061; H04W 36/00; H04W 40/36; H04W 52/02; H04W 76/10
  See application file for complete search history.

(56) References Cited

U.S. PATENT DOCUMENTS

| | | | |
|---|---|---|---|
| 2008/0233963 | A1 | 9/2008 | Alanara et al. |
| 2009/0264132 | A1 | 10/2009 | Tajima et al. |
| 2009/0316657 | A1 | 12/2009 | Singh et al. |
| 2010/0130205 | A1 | 5/2010 | Jung et al. |
| 2010/0311420 | A1 | 12/2010 | Reza et al. |
| 2011/0103277 | A1 | 5/2011 | Watfa et al. |
| 2012/0003977 | A1 | 1/2012 | Iwamura et al. |
| 2012/0135701 | A1 | 5/2012 | Zhu et al. |
| 2012/0243417 | A1 | 9/2012 | Henttonen et al. |
| 2012/0257602 | A1 | 10/2012 | Takahashi et al. |
| 2012/0276899 | A1 | 11/2012 | Kolding et al. |
| 2013/0033105 | A1 | 2/2013 | Yang et al. |
| 2013/0122922 | A1 | 5/2013 | Cho et al. |
| 2013/0196713 | A1 | 8/2013 | Anbe |
| 2013/0208699 | A1 | 8/2013 | Tapio et al. |
| 2013/0229931 | A1* | 9/2013 | Kim ............... H04W 48/16 370/252 |
| 2013/0260811 | A1* | 10/2013 | Rayavarapu ....... H04W 76/19 455/509 |
| 2014/0086126 | A1 | 3/2014 | Park et al. |
| 2014/0179325 | A1 | 6/2014 | Xu et al. |
| 2014/0274000 | A1 | 9/2014 | Gosselin et al. |
| 2014/0274038 | A1* | 9/2014 | Singhal ........... H04W 52/0209 455/434 |
| 2014/0286315 | A1 | 9/2014 | Chen et al. |
| 2014/0370915 | A1 | 12/2014 | Jung et al. |
| 2015/0079991 | A1 | 3/2015 | Koskinen et al. |
| 2015/0140983 | A1 | 5/2015 | Cosimini et al. |
| 2015/0195755 | A1* | 7/2015 | Gulati ............. H04W 36/0061 455/436 |
| 2015/0215868 | A1 | 7/2015 | Xu |
| 2015/0215894 | A1 | 7/2015 | Hayashi et al. |
| 2015/0271783 | A1 | 9/2015 | Hu et al. |
| 2015/0327240 | A1* | 11/2015 | Yamada ............. H04W 72/02 455/552.1 |
| 2015/0359018 | A1 | 12/2015 | Li et al. |
| 2016/0057797 | A1 | 2/2016 | Bangolae et al. |
| 2016/0135247 | A1 | 5/2016 | Ozturk et al. |
| 2016/0142951 | A1 | 5/2016 | Balasubramanian et al. |
| 2016/0165490 | A1 | 6/2016 | Nagasaka et al. |
| 2016/0174111 | A1 | 6/2016 | Zhu et al. |
| 2016/0278160 | A1 | 9/2016 | Schliwa-Bertling et al. |
| 2016/0345243 | A1* | 11/2016 | Zaus ................. H04W 48/18 |
| 2017/0019809 | A1 | 1/2017 | Saikusa |
| 2017/0171786 | A1 | 6/2017 | Mochizuki et al. |
| 2017/0303174 | A1 | 10/2017 | Serravalle |
| 2019/0182840 | A1 | 6/2019 | Feng et al. |

FOREIGN PATENT DOCUMENTS

| | | |
|---|---|---|
| CN | 101668280 A | 3/2010 |
| CN | 101686517 A | 3/2010 |
| CN | 101771952 A | 7/2010 |
| CN | 101861743 A | 10/2010 |
| CN | 102090120 A | 6/2011 |
| CN | 102170626 A | 8/2011 |
| CN | 102300309 A | 12/2011 |
| CN | 102369741 A | 3/2012 |
| CN | 102469548 A | 5/2012 |
| CN | 102754495 A | 10/2012 |
| CN | 102860116 A | 1/2013 |
| CN | 103188750 A | 7/2013 |
| CN | 103444252 A | 12/2013 |
| CN | 103686955 A | 3/2014 |
| CN | 103687053 A | 3/2014 |
| CN | 103687055 A | 3/2014 |
| CN | 103716771 A | 4/2014 |
| CN | 103797849 A | 5/2014 |
| CN | 103906152 A | 7/2014 |
| CN | 103906262 A | 7/2014 |
| CN | 104144524 A | 11/2014 |
| CN | 104145508 A | 11/2014 |
| CN | 104247553 A | 12/2014 |
| CN | 104427565 A | 3/2015 |
| CN | 104754759 A | 7/2015 |
| CN | 105122672 A | 12/2015 |
| EP | 2621222 B1 | 7/2013 |
| EP | 2645803 A1 | 10/2013 |
| EP | 2645804 A1 | 10/2013 |
| EP | 2196059 B1 | 10/2018 |
| JP | 2007036541 A | 2/2007 |
| JP | 2010199632 A | 9/2010 |
| JP | 2011009798 A | 1/2011 |
| JP | 2013504234 A | 2/2013 |
| JP | 2013157723 A | 8/2013 |
| RU | 2469503 C2 | 12/2012 |
| WO | 2007088381 A1 | 8/2007 |
| WO | 2007095473 A1 | 8/2007 |
| WO | 2011035719 A1 | 3/2011 |
| WO | 2012045369 A1 | 4/2012 |
| WO | 2012131568 A2 | 10/2012 |
| WO | 2013016842 A1 | 2/2013 |
| WO | 2013144613 A1 | 10/2013 |
| WO | 2013189348 A2 | 12/2013 |
| WO | 2014030274 A1 | 2/2014 |
| WO | WO-2014175967 A1 * | 10/2014 ............. H04J 11/00 |
| WO | 2014183833 A1 | 11/2014 |
| WO | 2015014560 A1 | 2/2015 |
| WO | 2015020179 A1 | 2/2015 |
| WO | 2015136893 A1 | 9/2015 |
| WO | 2015196691 A1 | 12/2015 |

OTHER PUBLICATIONS

3GPP TS 36.321 V12.8.0 (Dec. 2015), 3rd Generation Partnership Project; Technical Specification Group Radio Access Network; Evolved Universal Terrestrial Radio Access (E-UTRA); Medium Access Control (MAC) protocol specification (Release 12), 77 pages.

Intel Corporation, Discussion on user plane solution of AS context reuse for NB-IOT. 3GPP TSG RAN WG2 Meeting #92, Anaheim, USA, Nov. 16 20, 2015, R2-156350, 6 pages.

Interim Editor (Nortel),"Merged UTRAN Architecture Description V0.0.2",TSG-RAN Working Group 3 meeting #2 TSGW3#2(99)147,Nyn shamn, Sweden, Mar. 15-19, 1999,Total 56 Pages.

3GPP TR 23.720 V1.2.0(Nov. 2015);3rd Generation Partnership Project;Technical Specification Group Services and System Aspects;Architecture enhancements for Cellular Internet of Things(Release 13);total 96 pages.

NTT Docomo, Inc., Work on user plane based solution with AS information stored in RAN[online], 3GPP TSG-RAN WG2#92 R2-156424, Nov. 20, 2015, Internet,total 13 pages.

Ericsson, RRC Connection Suspend and Resume[online], 3GPP TSG-RAN WG2#92, R2-156395, Nov. 20, 2015, total 12 pages.

XP051046169 3GPP TR 23.720 V1.1.0(Oct. 2015),3rd Generation Partnership Project;Technical Specification Group Services and

(56) References Cited

OTHER PUBLICATIONS

System Aspects;Architecture enhancements for Cellular Internet of Things(Release 13),total 90 pages.

3GPP TS 36.331 V12.7.0 (Sep. 2015),3rd Generation Partnership Project;Technical Specification Group Radio Access Network;Evolved Universal Terrestrial Radio Access (E-UTRA);Radio Resource Control (RRC);Protocol specification (Release 12),total 453 pages.

3GPP TS 36.300 V13.1.0 (Sep. 2015),3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 13),dated Sep. 2015,total 254 pages.

3GPP TS 36.423 V13.2.0 (Dec. 2015),3rd Generation Partnership Project;Technical Specification Group Radio Access Network;Evolved Universal Terrestrial Radio Access Network(E-UTRAN);X2 application protocol (X2AP)(Release 13), total 230 pages.

3GPP TS 36.101 V13.1.0 (Oct. 2015),3rd Generation Partnership Project;Technical Specification Group Radio Access Network;Evolved Universal Terrestrial Radio Access (E-UTRA);User Equipment (UE) radio transmission and reception (Release 13),total 762 pages.

3GPP TS 24.301 V13.4.0 (Dec. 2015),3rd Generation Partnership Project;Technical Specification Group Core Network and Terminals;Non-Access-Stratum (NAS) protocol for Evolved Packet System (EPS); Stage 3(Release 13),total 401 pages.

Huawei, HiSilicon, Introduction of UE power saving mode. 3GPP TSG-CT WG1 Meeting #86, Guangzhou, P.R of China, Jan. 20-24, 2014, C1-140286, 39 pages.

\* cited by examiner

MOBILITY MANAGEMENT METHOD FOR LOW OVERHEAD STATE

CROSS-REFERENCE TO RELATED APPLICATIONS

This application is a continuation of U.S. Pat. No. 11,178,583, filed on Jun. 29, 2018, which is a continuation of International Application No. PCT/CN2016/104700, filed on Nov. 4, 2016, which claims priority to International Patent Application No. PCT/CN2016/078165, filed on Mar. 31, 2016 and International Patent Application No. PCT/CN2015/100336, filed on Dec. 31, 2015. All of the aforementioned patent applications are hereby incorporated by reference in their entireties.

TECHNICAL FIELD

Embodiments of the present invention relate to the communications field, and more specifically, to a mobility management method, user equipment, and a base station.

BACKGROUND

Mobility management is important in a wireless mobile communications system. Generally, the mobility management may include a mobile network handover, cell reselection, and the like of user equipment (UE).

In a 3rd Generation Partnership Project (3GPP) Long Term Evolution (LTE)/LTE advanced (LTE-A) system, UE is in an idle state or a connected state. The UE in the idle state is not connected to a base station, cannot send data, and performs cell reselection in a moving process. If the UE in this state needs to send data, the UE needs to be handed over to the connected state first. The UE in the idle state may enter the connected state after obtaining a connection context and a cell-specific identifier of the UE in a radio resource control (RRC) connection establishment process. The UE in the connected state is connected to the base station and can send data, and a handover is performed in the moving process. The UE in the connected state may enter the idle state in an RRC connection release process.

A typical handover process of the UE in the connected state may include the following key steps. A source base station, that is, a current serving base station of the UE, configures a measurement parameter for the UE. The UE performs measurement and reports a measurement result to the source base station. The source base station sends a handover request to a target base station, and sends a handover command to the UE after the target base station acknowledges the handover request. The UE accesses the target base station, obtains uplink synchronization, sends a handover complete message, and so on.

In future network evolution, there are increasingly more network distribution forms such as a heterogeneous network (Hetnet), coordinated multipoint (CoMP) transmission, small cell networking, and small cell dense networking. These network distribution forms bring a new challenge to the mobility management of the UE. If the current handover process is still in use, the UE needs to continuously perform measurement and report, causing a large quantity of handover signaling overheads and a waste of radio resources.

SUMMARY

Embodiments of the present invention provide a mobility management method, user equipment, and a base station, so as to resolve a technical problem that frequent handovers in a moving process of UE that is in a connected state and that does not need to transmit data cause handover signaling overheads and a waste of radio resources.

According to a first aspect, an embodiment of the present invention provides a mobility management method. The method may include allocating, by a first base station to which a first cell belongs, a source identifier to user equipment (UE) in a connected state in a first cell, where the source identifier includes a first UE identifier used to identify the UE in the first base station. The method may also include storing a connection context of the UE in the connected state after determining that the UE enters a low-overhead state, where the UE enters the low-overhead state when satisfying a preset activation condition, and the UE in the low-overhead state stores the connection context and camps on a cell according to a cell reselection criterion in a moving process.

According to the mobility management method in this embodiment, after the UE enters the low-overhead state, a base station does not need to frequently participate in a handover process in the moving process of the UE, and stores the connection context of the UE. Therefore, when the UE needs to transmit data, the connection context can be transferred at any time, thereby saving a communications resource of a network device, and improving network communication efficiency.

In a possible design, the allocating, by a first base station to which a first cell belongs, a source identifier to user equipment (UE) in a connected state in a first cell includes: allocating, by the first base station to which the first cell belongs, the source identifier to the UE in the connected state in the first cell by using a cell broadcast message or a dedicated message or in a random access channel RACH process.

In a possible design, the preset activation condition includes at least one of the following conditions: the first base station sends, to the UE, a control instruction used to instruct the UE to enter the low-overhead state; the first base station does not transmit data with the UE in first preset duration; the first base station determines that a timing advance timer TA timer of the UE expires, or the first base station determines that a TA timer of the UE expires and that the TA timer does not rerun in second preset duration; and the first base station determines that the UE does not exit from a discontinuous reception DRX state in third preset duration after entering the DRX state.

In a possible design, after the determining that the UE enters a low-overhead state, the method further includes: sending, by the first base station, radio resource control RRC configuration information to the UE for use by the UE in the low-overhead state.

In a possible design, the RRC configuration information includes an RRC configuration index, and the configuration index is used to indicate the RRC configuration information.

In a possible design, after the determining that the UE enters a low-overhead state, the method further includes: receiving, by the first base station, a notification message sent by a second base station to which a second cell belongs, where the notification message carries the source identifier of the UE and a second cell identifier of the second cell in which the UE is currently located, and the second cell is a serving cell on which the UE currently camps; and determining, by the first base station according to the source identifier and the second cell identifier, that the serving cell on which the UE currently camps is the second cell.

In a possible design, after the determining, by the first base station according to the source identifier and the second cell identifier, that the serving cell on which the UE currently camps is the second cell, the method further includes: sending, by the first base station, the connection context and the source identifier of the UE to the second base station when downlink data for the UE reaches the first base station, where the second base station is a base station to which the second cell belongs.

According to the mobility management method in this embodiment, after the UE enters the low-overhead state, a base station does not need to frequently participate in a handover process in the moving process of the UE, thereby saving a communications resource of a network device. When the base station needs to send the downlink data to the UE, the base station can proactively hand over, according to location information reported by the UE to a network, the context of the UE to the base station to which the UE currently belongs, thereby ensuring data transmission efficiency.

In a possible design, the notification message carries verification information of the UE, and the verification information is identity check information generated by the UE according to the source identifier and a key included in the connection context; and after the receiving, by the first base station, a notification message sent by a second base station, the method further includes: determining, by the first base station according to the source identifier and the verification information, whether the UE is authorized UE.

In a possible design, after the determining that the UE enters a low-overhead state, the method further includes: receiving a connection context transfer request, where the transfer request is sent by the second base station to which the second cell belongs, the transfer request carries the source identifier of the UE, and the second cell is a cell on which the UE currently camps; and sending the connection context to the second base station according to the source identifier carried in the transfer request.

In a possible design, after the determining that the UE enters a low-overhead state, the method further includes: sending, by the first base station, a second paging message to a third base station when downlink data for the UE reaches the first base station or after a first paging message is received from a core network, where the third base station and the first base station belong to a same paging region.

In a possible design, when the downlink data for the UE reaches the first base station or before the first paging message is received from the core network, the method further includes: receiving information about a paging parameter that is sent from the core network, where the paging parameter includes a paging index of the UE or a DRX cycle of the UE, and the paging parameter is used to calculate a paging offset of the UE.

In a possible design, the second paging message includes a paging parameter, a TMSI, and/or the source identifier of the UE, and the paging parameter includes a paging index of the UE and/or a DRX cycle of the UE.

In a possible design, after the sending, by the first base station, a second paging message to a third base station, the method further includes: receiving a paging response message sent by the third base station, and determining, according to the paging response message, that the UE currently belongs to the third base station.

In a possible design, the method further includes: sending, by the first base station to the UE, an instruction for permitting access by the UE in the low-overhead state; sending, by the first base station to the UE, a type of the source identifier that is permitted to report by the UE in the low-overhead state, where the type of the source identifier includes a short source identifier or a long source identifier; or allocating, by the first base station to which the first cell belongs, a short source identifier and a long source identifier to the user equipment (UE) in the connected state in the first cell.

According to the mobility management method in this embodiment, after the UE enters the low-overhead state, a base station does not need to frequently participate in a handover process in the moving process of the UE, thereby saving a communications resource of a network device. When the UE needs to send uplink data to a current serving base station, the UE can request to hand over, according to the source identifier reported by the UE to a network, the context of the UE to the base station to which the UE currently belongs, thereby ensuring data transmission efficiency.

According to a second aspect, an embodiment of the present invention provides a mobility management method. The method may include receiving, by user equipment (UE) in a connected state in a first cell, a source identifier allocated by a first base station to which a first cell belongs, where the source identifier includes a first UE identifier used to uniquely identify the UE in the first base station. The method may also include entering, by the UE, a low-overhead state when satisfying a preset activation condition, storing, by the UE in the low-overhead state, a connection context of the UE in the connected state, and camping on a cell according to a cell reselection criterion in a moving process. The method may also include reporting, by the UE when satisfying a first preset condition, the source identifier to a second base station to which a second cell belongs, where the second cell is a serving cell on which the UE currently camps.

According to the mobility management method in this embodiment, after entering the low-overhead state, the UE autonomously performs cell-reselection-based mobility, and reports only location change information of the UE, thereby simplifying a handover process, and saving a communications resource of a network device. When the UE needs to perform data communication with the network device, the UE may send a notification to a network, so that the context of the UE is handed over to a base station to which the UE currently belongs by using the network, thereby ensuring data transmission efficiency.

In a possible design, the preset activation condition includes at least one of the following conditions: the UE receives, from the first base station, a control instruction used to instruct to enter the low-overhead state; the UE leaves the first cell; the UE does not transmit data with the first base station in first preset duration; a timing advance timer (TA timer) of the UE expires, or a TA timer of the UE expires and the TA timer does not rerun in second preset duration; and the UE does not exit from a discontinuous reception DRX state in third preset duration after entering the DRX state.

In a possible design, after the entering, by the UE, a low-overhead state when satisfying a preset activation condition, the method further includes: exiting, by the UE, from the low-overhead state when satisfying a second preset condition, where the second preset condition includes: the serving cell on which the UE currently camps changes; the serving cell on which the UE currently camps is not included in a specified cell set; the serving cell on which the UE currently camps and the first cell do not belong to a same preset region or a same base station; the UE sends the source identifier to the second base station and receives an access rejection instruction corresponding to the source identifier from the second base station; the UE reads a system information broadcast of the second cell, and the system information broadcast does not carry an instruction for permitting access by the UE in the low-overhead state; or the UE needs to send uplink data.

In a possible design, the exiting, by the UE, from the low-overhead state when satisfying a second preset condition includes: deleting, by the UE, the connection context when satisfying the second preset condition, and entering an idle state.

In a possible design, the first preset condition includes: the serving cell on which the UE currently camps changes; the second cell on which the UE currently camps is not included in a specified cell set; the second cell on which the UE currently camps and the first cell do not belong to a same preset region or a same base station; or the UE needs to send uplink data.

In a possible design, before the reporting, by the UE when satisfying a first preset condition, the source identifier to a second base station to which a second cell belongs, the method includes: receiving and reading, by the UE, a system information broadcast of the second cell; and if the system information broadcast carries an instruction for permitting access by the UE in the low-overhead state, determining, by the UE according to the access instruction, to send the source identifier to the second base station; or determining, by the UE according to indication information sent by the second base station, to report a long source identifier or a short source identifier, where the long source identifier and the short source identifier may be two separate source identifiers, or the short source identifier is some information of the long source identifier.

In a possible design, when the first preset condition is satisfied, the indication information of the second base station is indication information configured by using a system information broadcast or authorization information sent to the UE by using an authorization command, and the determining, by the UE according to indication information of the second base station, to report a long source identifier or a short source identifier includes: determining, by the UE according to an indication in the indication information configured in the system information broadcast, a source identifier type used to report the source identifier; or determining, by the UE according to the authorization information, a size of a transmissible message, and choosing, according to the size of the transmissible message, to use the long source identifier or the short source identifier.

In a possible design, before the reporting, by the UE when satisfying a first preset condition, the source identifier to a second base station to which a second cell belongs, the method further includes: sending, by the UE, a random access preamble within a preset range to the second base station, where the random access preamble within the preset range is used to indicate that the source identifier needs to be sent to the second base station or that a message whose size is greater than a preset length threshold needs to be sent to the second base station; receiving a transmission resource with a preset size that is allocated by the second base station and that is used to transmit the source identifier; and using the transmission resource to send the source identifier to the second base station.

In a possible design, the random access preamble within the preset range is a predefined preamble or a preamble configured by and received from the second base station.

In a possible design, the reporting, by the UE, the source identifier to a second base station to which a second cell belongs includes: sending, by the UE, the random access preamble to the second base station; receiving a dedicated UE identifier sent by the second base station and the transmission resource that is allocated according to the random access preamble and that is used to transmit the source identifier, where the dedicated UE identifier is an identifier used to uniquely identify the UE in the second cell; using the transmission resource to send the source identifier to the second base station; receiving acknowledgement information that is sent by the second base station and that includes the source identifier; and determining, according to the acknowledgement information, whether to apply the dedicated UE identifier.

In a possible design, the determining, according to the acknowledgement information, whether to apply the dedicated UE identifier includes: skipping applying, by the UE, the dedicated UE identifier according to the acknowledgement information; applying, by the UE, the dedicated UE identifier according to the acknowledgement information, and exiting from the low-overhead state; applying, by the UE, the dedicated UE identifier according to the acknowledgement information, and remaining in the low-overhead state; or applying, by the UE according to an instruction that is carried in the acknowledgement information and that is used to instruct the UE to exit from the low-overhead state, the dedicated UE identifier and exiting from the low-overhead state.

In a possible design, after the applying, by the UE, the dedicated UE identifier, the method includes: updating a key in the connection context according to a cell identifier of the serving cell that is currently camped on.

In a possible design, the source identifier further includes verification information, and the verification information is identity check information generated by the UE according to the source identifier and the updated key.

In a possible design, after the entering, by the UE, a low-overhead state when satisfying a preset activation condition, the method further includes: performing, by the UE, paging monitoring by using the source identifier.

In a possible design, after the entering, by the UE, a low-overhead state when satisfying a preset activation condition, the method further includes: receiving radio resource control RRC configuration information sent by the first base station, where the RRC configuration information includes an RRC configuration index, and the configuration index is used to indicate the RRC configuration information; and using, by the UE in the low-overhead state, the RRC configuration information.

In a possible design, the reporting, by the UE when satisfying a first preset condition, the source identifier to a second base station to which a second cell belongs includes: reporting, by the UE, the source identifier including the RRC configuration index to the second base station to which the second cell belongs, so that the second base station determines, according to the RRC configuration index, the RRC configuration information used by the UE.

In a possible design, the first preset condition is that the UE needs to send the uplink data, and the reporting, by the UE, the source identifier to a second base station to which a second cell belongs, the method further includes: reporting, by the UE when or after reporting the source identifier, an uplink data indication to the second base station to which the second cell belongs.

According to a third aspect, an embodiment of the present invention provides a mobility management method. The method may include: receiving, by a second base station to which a second cell belongs, a source identifier reported by user equipment (UE) in a low-overhead state, where the UE in the low-overhead state stores a connection context of the UE in a connected state and camps on a cell according to a cell reselection criterion in a moving process, a first cell is a serving cell of the UE when the UE enters the low-overhead state, a second cell is a current serving cell of the UE, and the source identifier includes a first UE identifier used to identify the UE in a first base station to which the first cell belongs. The method may include sending the first UE identifier to the first base station according to the source identifier, to instruct the first base station to learn that the current serving cell of the UE is the second cell.

According to the mobility management method in this embodiment, after the UE enters the low-overhead state, a network device does not need to frequently participate in a handover process in the moving process of the UE, thereby saving a communications resource of the network device. When the network device needs to perform data communication with the UE, the network device can hand over, according to location information reported by the UE to a network, the context of the UE to a base station to which the UE currently belongs, thereby ensuring data transmission efficiency.

In a possible design, the source identifier further includes indication information, and the indication information is used to notify the second base station that the UE is in the low-overhead state.

In a possible design, before the receiving, by a second base station to which a second cell belongs, a source identifier reported by user equipment (UE) in a low-overhead state, the method includes: sending, by the second base station, a system information broadcast, where the system information broadcast carries an instruction for permitting access by the UE in the low-overhead state, so that the UE determines, according to the access instruction, whether to send the source identifier to the second base station.

In a possible design, before the receiving, by a second base station to which a second cell belongs, a source identifier reported by user equipment (UE) in a low-overhead state, the method further includes: receiving a random access preamble sent by the UE; and allocating a transmission resource with a preset size to the UE when the random access preamble is within a preset range, so that the UE uses the transmission resource to send the source identifier.

In a possible design, the random access preamble within the preset range is a predefined preamble or a preamble configured by and received from the second base station.

In a possible design, the receiving, by a second base station to which a second cell belongs, a source identifier reported by user equipment (UE) in a low-overhead state includes: receiving, by the second base station to which the second cell belongs, a random access preamble sent by the user equipment (UE) in the low-overhead state; allocating, to the UE according to the random access preamble, a dedicated UE identifier and a transmission resource used to transmit the source identifier, where the dedicated UE identifier is an identifier used to uniquely identify the UE in the second cell; using the transmission resource to receive the source identifier; and sending acknowledgement information including the source identifier to the UE.

In a possible design, the sending acknowledgement information including the source identifier to the UE includes: sending, to the UE, an acknowledgement message that includes the source identifier and that carries an instruction used to instruct the UE to exit from the low-overhead state, so that the UE applies the dedicated UE identifier and exits from the low-overhead state according to the instruction.

In a possible design, the sending the first UE identifier to the first base station according to the source identifier includes: sending a notification message to the first base station according to the source identifier, where the notification message carries the source identifier of the UE and a second cell identifier of the second cell in which the UE is currently located, so that the first base station determines, according to the source identifier and the second cell identifier, that the serving cell on which the UE currently camps is the second cell.

In a possible design, after the sending the first UE identifier to the first base station according to the source identifier, the method further includes: receiving an uplink data indication that is sent by the UE and that includes the source identifier; sending, by the second base station, a connection context transfer request to the first base station, where the connection context is the connection context of the UE in the connected state that is stored by the first base station when the UE enters the low-overhead state, and the connection context transfer request carries the source identifier of the UE; and receiving the connection context transferred by the first base station, and establishing a connection to the UE according to the connection context.

In a possible design, after the receiving the connection context transferred by the first base station, the method further includes: sending a re-allocated source identifier to the UE, where the re-allocated source identifier includes a second UE identifier used to identify the UE in the second base station; and sending an instruction to the UE to instruct the UE to exit from the low-overhead state.

In a possible design, after the sending the first UE identifier to the first base station according to the source identifier, the method further includes: receiving the connection context and the source identifier of the UE that are sent by the first base station; and determining configuration information of the UE according to the received connection context and source identifier, and triggering uplink access by the UE according to the source identifier.

In a possible design, the triggering uplink access by the UE according to the source identifier includes: initiating paging to the UE by using the source identifier; determining the dedicated UE identifier of the UE according to the source identifier, and sending an uplink access command to the UE by using the dedicated UE identifier; or determining the dedicated UE identifier of the UE according to the source identifier, and initiating paging to the UE by using the dedicated UE identifier.

In a possible design, the source identifier further includes a radio resource control RRC configuration index, and after the receiving, by a second base station to which a second cell belongs, a source identifier reported by user equipment (UE) in a low-overhead state, the method further includes: determining, by the second base station according to the RRC configuration index, RRC configuration information used by the UE.

In a possible design, the sending the first UE identifier to the first base station according to the source identifier includes: sending the source identifier to the first base station according to the source identifier by using an inter-base station interface between the second base station and the first base station; or sending the source identifier to the first base station according to the source identifier by using a core network.

According to a fourth aspect, an embodiment of the present invention provides a base station, where the base station is a first base station, and the first base station may include an output unit, a storage unit, and a processing unit. The storage unit is configured to store program code, and the processing unit is configured to invoke the program code stored in the storage unit, to perform the following steps: allocating, by using the output unit, a source identifier to user equipment (UE) in a connected state in a first cell, where the source identifier includes a first UE identifier used to identify the UE in the first base station; and storing a connection context of the UE in the connected state after determining that the UE enters a low-overhead state, where the UE enters the low-overhead state when satisfying a preset activation condition, and the UE in the low-overhead state stores the connection context and camps on a cell according to a cell reselection criterion in a moving process.

In a possible design, that the processing unit is configured to allocate, by using the output unit, a source identifier to user equipment (UE) in a connected state in a first cell is specifically: allocating the source identifier to the UE in the connected state in the first cell by using a cell broadcast message or a dedicated message that is output by the output unit or in a random access channel RACH process.

In a possible design, the preset activation condition includes at least one of the following conditions: the first base station sends, to the UE, a control instruction used to instruct the UE to enter the low-overhead state; the first base station does not transmit data with the UE in first preset duration; the first base station determines that a timing advance timer (TA timer) of the UE expires, or the first base station determines that a TA timer of the UE expires and that the TA timer does not rerun in second preset duration; and the first base station determines that the UE does not exit from a discontinuous reception DRX state in third preset duration after entering the DRX state.

In a possible design, the processing unit is further configured to: send, by using the output unit, radio resource control RRC configuration information to the UE for use by the UE in the low-overhead state.

In a possible design, the RRC configuration information includes an RRC configuration index, and the configuration index is used to indicate the RRC configuration information.

In a possible design, the base station further includes an input unit, and the processing unit is further configured to: receive, by using the input unit after determining that the UE enters the low-overhead state, a notification message sent by a second base station to which a second cell belongs, where the notification message carries the source identifier of the UE and a second cell identifier of the second cell in which the UE is currently located, and the second cell is a serving cell on which the UE currently camps; and determine, according to the source identifier and the second cell identifier, that the serving cell on which the UE currently camps is the second cell.

In a possible design, the processing unit is further configured to: after determining, according to the source identifier and the second cell identifier, that the serving cell on which the UE currently camps is the second cell, send, by using the output unit, the connection context and the source identifier of the UE to the second base station when downlink data for the UE reaches the first base station, where the second base station is a base station to which the second cell belongs.

In a possible design, the base station further includes the input unit; the notification message carries verification information of the UE, and the verification information is identity check information generated by the UE according to the source identifier and a key included in the connection context; and the processing unit is further configured to: determine, by using the input unit according to the source identifier and the verification information after receiving the notification message sent by the second base station, whether the UE is authorized UE.

In a possible design, the base station further includes an input unit, and the processing unit is further configured to: receive, by using the input unit after determining that the UE enters the low-overhead state, a connection context transfer request sent by a second base station to which a second cell belongs, where the transfer request carries the source identifier of the UE, and the second cell is a cell on which the UE currently camps; and send, by using the output unit, the connection context to the second base station according to the source identifier carried in the transfer request.

In a possible design, the base station further includes the processing unit, and the processing unit is further configured to: send, by using the output unit, a system information broadcast before receiving, by using the input unit, the source identifier reported by the user equipment (UE) in the low-overhead state, where the system information broadcast carries a type of the source identifier that is permitted to report by the UE in the low-overhead state, so that the UE determines, according to the type of the source identifier, to use a short source identifier or a long source identifier; allocate, by using the output unit, a short source identifier and a long source identifier to the UE before receiving, by using the input unit, the source identifier reported by the user equipment (UE) in the low-overhead state; send, by using the output unit, a second paging message to a third base station when downlink data received by using the input unit reaches the first base station or after a first paging message is received from a core network, where the third base station and the first base station belong to a same paging region; or receive, by using the input unit before downlink data received by using the input unit reaches the first base station, information about a paging parameter that is sent from a core network, where the paging parameter includes a paging index of the UE or a DRX cycle of the UE, and the paging parameter is used to calculate a paging offset of the UE.

According to a fifth aspect, an embodiment of the present invention provides user equipment (UE), where the user equipment (UE) may include an input unit, an output unit, a storage unit, and a processing unit; and the storage unit is configured to store program code, and the processing unit is configured to invoke the program code stored in the storage unit, to perform the following steps: receiving, by using the input unit, a source identifier allocated by a first base station to which a first cell belongs, where the source identifier includes a first UE identifier used to uniquely identify the UE in the first base station; entering, by the UE, a low-overhead state when satisfying a preset activation condition, storing, by the UE in the low-overhead state, a connection context of the UE in a connected state, and camping on a cell according to a cell reselection criterion in a moving process; and reporting, by using the output unit when a first preset condition is satisfied, the source identifier to a second base station to which a second cell belongs, where the second cell is a serving cell on which the UE currently camps.

In a possible design, the preset activation condition includes at least one of the following conditions: the UE receives, from the first base station, a control instruction used to instruct to enter the low-overhead state; the UE leaves the first cell; the UE does not transmit data with the first base station in first preset duration; a timing advance timer (TA timer) of the UE expires, or a TA timer of the UE expires and the TA timer does not rerun in second preset duration; and the UE does not exit from a discontinuous reception DRX state in third preset duration after entering the DRX state.

In a possible design, the processing unit is further configured to: exit, by the UE after the UE enters the low-overhead state when satisfying the preset activation condition, from the low-overhead state when a second preset condition is satisfied, where the second preset condition includes: the serving cell on which the UE currently camps changes; the serving cell on which the UE currently camps is not included in a specified cell set; the serving cell on which the UE currently camps and the first cell do not belong to a same preset region or a same base station; the UE sends the source identifier to the second base station and receives an access rejection instruction corresponding to the source identifier from the second base station; the UE reads a system information broadcast of the second cell, and the system information broadcast does not carry an instruction for permitting access by the UE in the low-overhead state; or the UE needs to send uplink data.

In a possible design, that the processing unit is configured to exit, by the UE, from the low-overhead state when a second preset condition is satisfied is specifically: deleting the connection context when the second preset condition is satisfied, and entering an idle state.

In a possible design, the first preset condition includes: the serving cell on which the UE currently camps changes; the second cell on which the UE currently camps is not included in a specified cell set; the second cell on which the UE currently camps and the first cell do not belong to a same preset region or a same base station; or the UE needs to send uplink data.

In a possible design, the processing unit is further configured to: before reporting, by using the output unit when the first preset condition is satisfied, the source identifier to the second base station to which the second cell belongs, receive and read, by using the input unit, a system information broadcast of the second cell; and if the system information broadcast carries an instruction for permitting access by the UE in the low-overhead state, determine, according to the access instruction, to send the source identifier to the second base station by using the output unit.

In a possible design, the processing unit is further configured to: before reporting, by using the output unit when the first preset condition is satisfied, the source identifier to the second base station to which the second cell belongs, send, by using the output unit, a random access preamble within a preset range to the second base station, where the random access preamble within the preset range is used to indicate that the source identifier needs to be sent to the second base station or that a message whose size is greater than a preset length threshold needs to be sent to the second base station; receive, by using the input unit, a transmission resource with a preset size that is allocated by the second base station and that is used to transmit the source identifier; and use the transmission resource and the output unit to send the source identifier to the second base station.

In a possible design, the random access preamble within the preset range is a predefined preamble or a preamble configured by and received from the second base station.

In a possible design, that the processing unit is configured to report the source identifier to a second base station to which a second cell belongs is specifically: sending, by using the output unit, the random access preamble to the second base station; receiving, by using the input unit, a dedicated UE identifier sent by the second base station and the transmission resource that is allocated according to the random access preamble and that is used to transmit the source identifier, where the dedicated UE identifier is an identifier used to uniquely identify the UE in the second cell; using the output unit and the transmission resource to send the source identifier to the second base station; receiving, by using the input unit, acknowledgement information that is sent by the second base station and that includes the source identifier; and determining, according to the acknowledgement information, whether to apply the dedicated UE identifier.

In a possible design, that the processing unit is configured to determine, according to the acknowledgement information, whether to apply the dedicated UE identifier is specifically: skipping applying, by the processing unit, the dedicated UE identifier according to the acknowledgement information; applying, by the processing unit, the dedicated UE identifier according to the acknowledgement information, and exiting from the low-overhead state; applying, by the processing unit, the dedicated UE identifier according to the acknowledgement information, and remaining in the low-overhead state; or applying, by the processing unit according to an instruction that is carried in the acknowledgement information and that is used to instruct the UE to exit from the low-overhead state, the dedicated UE identifier and exiting from the low-overhead state.

In a possible design, the processing unit is further configured to: after the UE applies the dedicated UE identifier, update a key in the connection context according to a cell identifier of the serving cell that is currently camped on.

In a possible design, the source identifier further includes verification information, and the verification information is identity check information generated by the UE according to the source identifier and the updated key.

In a possible design, the processing unit is further configured to: perform paging monitoring by using the source identifier after the UE enters the low-overhead state when satisfying the preset activation condition.

In a possible design, the processing unit is further configured to: receive, by using the input unit after the UE enters the low-overhead state when satisfying the preset activation condition, radio resource control RRC configuration information sent by the first base station, where the RRC configuration information includes an RRC configuration index, and the configuration index is used to indicate the RRC configuration information; and use, by the UE in the low-overhead state, the RRC configuration information.

In a possible design, that the processing unit is configured to report, when the first preset condition is satisfied, the source identifier to a second base station to which a second cell belongs is specifically: reporting, by using the output unit, the source identifier including the RRC configuration index to the second base station to which the second cell belongs, so that the second base station determines, according to the RRC configuration index, the RRC configuration information used by the UE.

In a possible design, that the processing unit is configured to report, when the first preset condition is that the UE needs to send the uplink data, the source identifier to a second base station to which a second cell belongs is specifically: reporting, by using the output unit, an uplink data indication including the source identifier to the second base station to which the second cell belongs.

In a possible design, the processing unit is configured to: before reporting, by using the output unit when the first preset condition is satisfied, the source identifier to the second base station to which the second cell belongs, receive and read, by using the input unit, indication information sent by the second base station, and determine, according to the indication information, to send a type of the source identifier to the second base station by using the output unit; and/or receive, by using the input unit when the first preset condition is satisfied, a short source identifier and a long source identifier that are allocated by the first base station to which the first cell belongs.

In a possible design, the indication information is authorization information sent to the UE by using an authorization command, and the processing unit is further configured to: determine, according to the authorization information, a size of a transmissible message, and choose, according to the size of the transmissible message, to use the long source identifier or the short source identifier.

According to a sixth aspect, an embodiment of the present invention provides a base station, where the base station is a second base station, the second base station may include an input unit, an output unit, a storage unit, and a processing unit. The storage unit is configured to store program code, and the processing unit is configured to invoke the program code stored in the storage unit, to perform the following steps: receiving, by using the input unit, a source identifier reported by user equipment (UE) in a low-overhead state, where the UE in the low-overhead state stores a connection context of the UE in a connected state and camps on a cell according to a cell reselection criterion in a moving process, a first cell is a serving cell of the UE when the UE enters the low-overhead state, a second cell is a current serving cell of the UE, and the source identifier includes a first UE identifier used to identify the UE in a first base station to which the first cell belongs; and sending, by using the output unit, the first UE identifier to the first base station according to the source identifier, to instruct the first base station to learn that the current serving cell of the UE is the second cell.

In a possible design, the source identifier further includes indication information, and the indication information is used to notify the second base station that the UE is in the low-overhead state.

In a possible design, the processing unit is further configured to: send, by using the output unit, a system information broadcast before receiving, by using the input unit, the source identifier reported by the user equipment (UE) in the low-overhead state, where the system information broadcast carries an instruction for permitting access by the UE in the low-overhead state, so that the UE determines, according to the access instruction, whether to send the source identifier to the second base station.

In a possible design, the processing unit is further configured to: before receiving, by using the input unit, the source identifier reported by the user equipment (UE) in the low-overhead state, receive, by using the input unit, a random access preamble sent by the UE; and allocate, by using the output unit, a transmission resource with a preset size to the UE when the random access preamble is within a preset range, so that the UE uses the transmission resource to send the source identifier.

In a possible design, the random access preamble within the preset range is a predefined preamble or a preamble configured by and received from the second base station.

In a possible design, that the processing unit is configured to receive, by using the input unit, a source identifier reported by user equipment (UE) in a low-overhead state is specifically: receiving, by using the input unit, a random access preamble sent by the user equipment (UE) in the low-overhead state; allocating, to the UE by using the output unit according to the random access preamble, a dedicated UE identifier and a transmission resource used to transmit the source identifier, where the dedicated UE identifier is an identifier used to uniquely identify the UE in the second cell; using the input unit and the transmission resource to receive the source identifier; and sending, by using the output unit, acknowledgement information including the source identifier to the UE.

In a possible design, that the processing unit sends, by using the output unit, acknowledgement information including the source identifier to the UE is specifically: sending, to the UE by using the output unit, an acknowledgement message that includes the source identifier and that carries an instruction used to instruct the UE to exit from the low-overhead state, so that the UE applies the dedicated UE identifier and exits from the low-overhead state according to the instruction.

In a possible design, that the processing unit sends, by using the output unit, the first UE identifier to the first base station according to the source identifier is specifically: sending, by using the output unit, a notification message to the first base station according to the source identifier, where the notification message carries the source identifier of the UE and a second cell identifier of the second cell in which the UE is currently located, so that the first base station determines, according to the source identifier and the second cell identifier, that the serving cell on which the UE currently camps is the second cell.

In a possible design, the processing unit is further configured to: after sending the first UE identifier to the first base station by using the output unit according to the source identifier, receive an uplink data indication that is sent by the UE and that includes the source identifier; send, by using the output unit, a connection context transfer request to the first base station, where the connection context is the connection context of the UE in the connected state that is stored by the first base station when the UE enters the low-overhead state, and the connection context transfer request carries the source identifier of the UE; and receive, by using the input unit, the connection context transferred by the first base station, and establish a connection to the UE according to the connection context.

In a possible design, the processing unit is further configured to: send, by using the output unit, a re-allocated source identifier to the UE after receiving, by using the input unit, the connection context transferred by the first base station, where the re-allocated source identifier includes a second UE identifier used to identify the UE in the second base station; and send, by using the output unit, an instruction to the UE, to instruct the UE to exit from the low-overhead state.

In a possible design, the processing unit is further configured to: receive, by using the input unit after sending the first UE identifier to the first base station by using the output unit according to the source identifier, the connection context and the source identifier of the UE that are sent by the first base station; and determine configuration information of the UE according to the received connection context and source identifier, and trigger uplink access by the UE according to the source identifier.

In a possible design, that the processing unit is configured to trigger uplink access by the UE according to the source identifier is specifically: initiating paging to the UE by using the source identifier; determining the dedicated UE identifier of the UE according to the source identifier, and sending an uplink access command to the UE by using the dedicated UE identifier; or determining the dedicated UE identifier of the UE according to the source identifier, and initiating paging to the UE by using the dedicated UE identifier.

In a possible design, the source identifier further includes a radio resource control RRC configuration index, and the processing unit is further configured to: determine, according to the RRC configuration index after receiving, by using the input unit, the source identifier reported by the user equipment (UE) in the low-overhead state, RRC configuration information used by the UE.

In a possible design, that the processing unit is configured to send, by using the output unit, the first UE identifier to the first base station according to the source identifier is specifically: sending the source identifier to the first base station according to the source identifier by using an inter-base station interface between the output unit and the first base station; or sending the source identifier to the first base station according to the source identifier by using the output unit and a core network.

In some possible implementations of the first aspect, the second aspect, the third aspect, the fourth aspect, the fifth aspect, and the sixth aspect, the source identifier includes a first cell identifier used to identify the first cell and the first UE identifier used to uniquely identify the UE in the first cell, the first cell identifier includes at least one of a cell universal identifier, a physical cell identifier PCI, and a cell identifier including an identifier of a region and an identifier of the first cell in the region; or the source identifier includes a first base station identifier used to uniquely identify the first base station and the first UE identifier used to uniquely identify the UE in the first base station.

In the embodiments of the present invention, the low-overhead state is designed, so that the UE in this state stores the connection context of the UE in the connected state and camps on the cell according to the cell reselection criterion in the moving process. In addition, the UE in the low-overhead state receives a source identifier sent by a source base station, and reports the source identifier to a current serving base station of the UE in the moving process when a specified condition is satisfied. Finally, the serving base station sends the source identifier to the source base station. In this way, both the serving base station and the source base station can learn of location information of the UE. That is, after the UE enters the low-overhead state, the UE autonomously performs cell-reselection-based mobility, and reports only location change information of the UE, thereby simplifying a handover process, and saving a communications resource of a network device. Further, after the UE enters the low-overhead state, both the source base station and the UE store the connection context of the UE. Therefore, when the UE needs to perform uplink or downlink data communication, the connection context of the UE can be handed over to the current serving base station of the UE, and further data is transmitted, thereby ensuring data transmission efficiency.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be understood that the technical solutions of the embodiments of the present invention may be applied to various communications systems, such as Global System for Mobile Communications (GSM), a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, and Universal Mobile Telecommunications System (UMTS).

It should be further understood that, in the embodiments of the present invention, a base station may be a base station ("Base Transceiver Station" or "BTS") in the GSM or CDMA, or may be a base station ("NodeB" or "NB") in the WCDMA, or may be an evolved NodeB ("eNB" or "eNodeB") in the LTE, or may be a base station device in a future 5G network, and this is not limited in the present invention.

It should be further understood that, in the embodiments of the present invention, UE may communicate with one or more core networks by using a radio access network (RAN). The UE may be referred to as an access terminal, a terminal device, a subscriber unit, a user station, a mobile station, a remote station, a remote terminal, a mobile device, a user terminal, a terminal, a wireless communications device, a user agent, or a user apparatus. The UE may be a cellular phone, a cordless phone, a smartphone, a Session Initiation Protocol (SIP) phone, a wireless local loop (WLL) station, a smart band, a smart wearable device, an Moving Picture Experts Group Audio Layer III (MP3) player, an Moving Picture Experts Group Audio Layer IV (MP4) player, a personal digital assistant (PDA), a handheld device with a wireless communication function, a computing device or another processing device connected to a radio modem, an in-vehicle device, a terminal device on a future 5G network, or the like.

Figure 1:
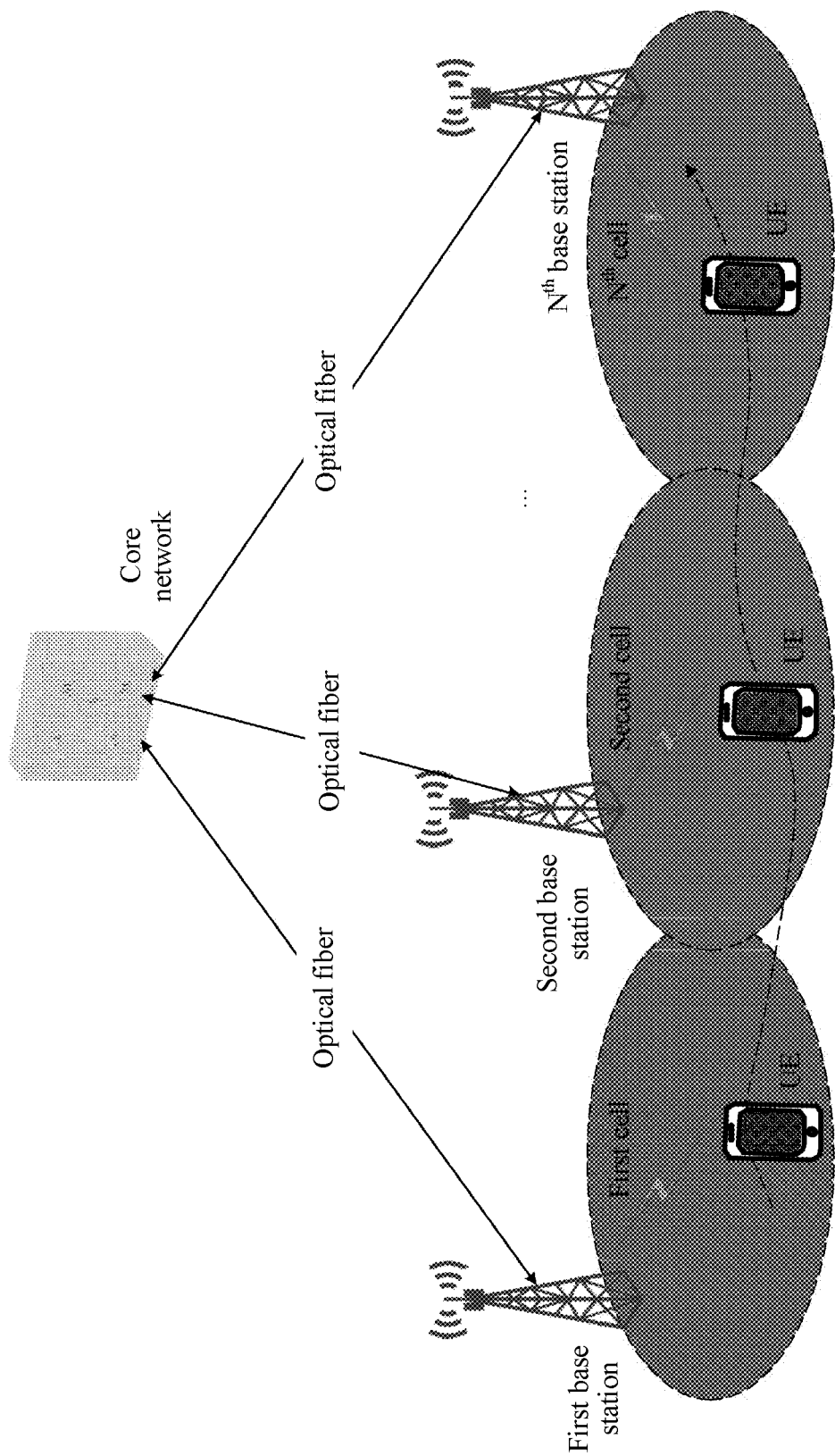
FIG. 1 is a schematic diagram of a mobility management network architecture according to embodiments of the present invention.

For ease of understanding the embodiments of the present invention, the following first describes a mobility management network architecture in the embodiments of the present invention. Referring to FIG. 1, the network architecture includes base stations, a core network, and user equipment (UE). In a process that the UE moves from a first cell to a second cell and then moves to an $N^{th}$ cell, data transmission is completed through wireless communication between the UE and a first base station, a second base station, or an $N^{th}$ base station that is corresponding to the UE, while the base stations are connected to the core network by using optical fibers and complete a connection, management, bearing, and the like of data or a service. It may be understood that the network architecture in FIG. 1 is merely a preferable implementation in the embodiments of the present invention, and a network architecture in the embodiments of the present invention includes but is not limited to the foregoing network architecture.

Figure 2:
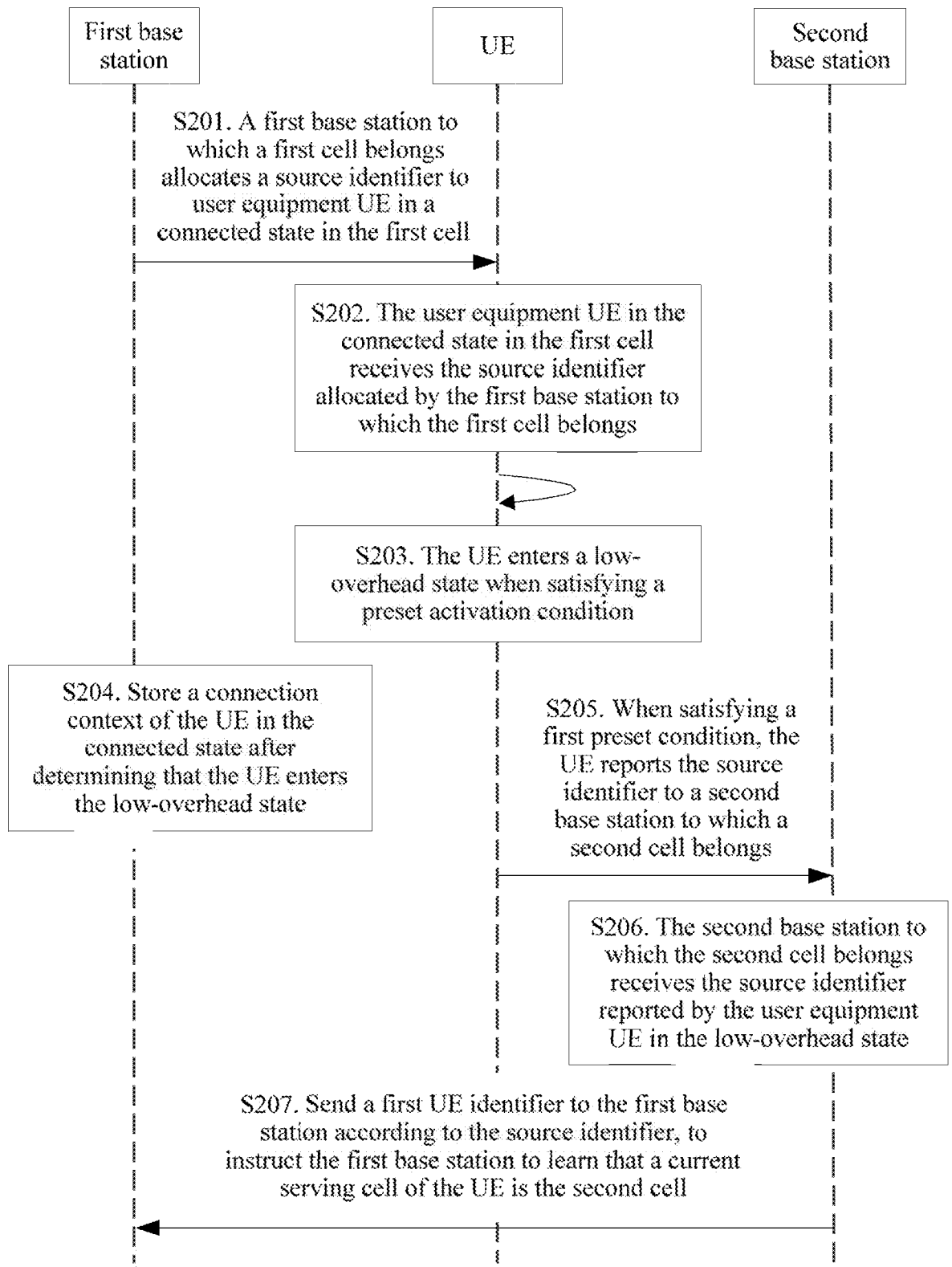
FIG. 2 is a schematic flowchart of a mobility management method according to embodiments of the present invention.

Referring to FIG. 2, FIG. 2 is a schematic flowchart of a mobility management method according to an embodiment of the present invention. The following provides detailed descriptions from a perspective of interaction between a first base station, user equipment (UE), and a second base station with reference to FIG. 2. As shown in FIG. 2, the method may include the following steps S201 to S207.

Step S201: The first base station to which a first cell belongs allocates a source identifier to the user equipment (UE) in a connected state in the first cell, where the source identifier includes a first UE identifier used to identify the UE in the first base station.

Specifically, the first base station allocates the source identifier to the UE in the connected state in the first cell by using a cell broadcast message or a dedicated message or in a random access channel RACH process.

Further, the first base station may allocate the source identifier by using the dedicated message or a radio resource control (RRC) message such as a radio bearer reconfiguration message, a radio bearer release message, or a radio bearer re-establishment message. Allocating the source identifier by using the RACH process may be adding the source identifier to a preamble acknowledgement message.

Further, the source identifier includes a first cell identifier used to identify the first cell and the first UE identifier used to uniquely identify the UE in the first cell. Alternatively, the source identifier includes a first base station identifier used to uniquely identify the first base station and the first UE identifier used to uniquely identify the UE in the first base station. A method for using the first UE identifier to uniquely identify the UE in the first cell is not limited to only using the first UE identifier to uniquely identify the UE. Alternatively, the first UE identifier and other assistance information such as check information may be used together to uniquely identify the UE. The check information is generated according to a key of the UE. Specifically, for example, the first cell identifier includes at least one of a cell universal identifier, a physical cell identifier PCI, and a cell identifier including an identifier of a region and an identifier of the first cell in the region. The region is a specified cell range obtained by means of network division. For example, if 256 cells form a region, a region identifier is 8 bits. If a maximum of 256 cells are supported in a region, a cell identifier in the region is 8 bits. Correspondingly, a cell identifier includes 16 bits, the first 8 bits are the region identifier, and the last 8 bits are the cell identifier in the region. Likewise, a base station identifier may also include an identifier of a region and an identifier of a base station in the region. Further, the source identifier may further include identifier division indication information. The identifier division indication information is used to indicate bit division of the source identifier into the base station identifier and the first UE identifier that is used to identify the UE in the base station. Different values of the identifier division indication information indicate different division rules. For example, if the source identifier occupies 50 bits, 2 bits are the identifier division indication information. When a value of the identifier division indication information is 0, it indicates that the base station identifier occupies 24 bits and the first UE identifier occupies (50−24−2=24) bits. When a value of the identifier division indication information is 1, it indicates that the base station identifier occupies 20 bits and the first UE identifier occupies (50−20−2=28) bits. Likewise, the source identifier may further include identifier division indication information. The identifier division indication information is used to indicate bit division of the source identifier into the first cell identifier and the first UE identifier used to identify the UE in the first cell. A specific method is similar to division between the base station identifier and the UE identifier.

Step S202: The user equipment (UE) in the connected state in the first cell receives the source identifier allocated by the first base station to which the first cell belongs, where the source identifier includes the first UE identifier used to uniquely identify the UE in the first base station.

Specifically, the UE receives, from the first base station to which the first cell belongs, the source identifier by using the cell broadcast message or the dedicated message or in the random access channel RACH process.

Step S203: The UE enters a low-overhead state when satisfying a preset activation condition, and the UE in the low-overhead state stores a connection context of the UE in the connected state and camps on a cell according to a cell reselection criterion in a moving process.

Specifically, for the UE side, the preset activation condition includes at least one of the following conditions: the UE receives, from the first base station, a control instruction used to instruct to enter the low-overhead state; the UE leaves the first cell; the UE does not transmit data with the first base station in first preset duration; a timing advance timer (TA timer) of the UE expires, or a TA timer of the UE expires and the TA timer does not rerun in second preset duration; and the UE does not exit from a discontinuous reception DRX state in third preset duration after entering the DRX state.

Further, the UE exits from the low-overhead state when satisfying a second preset condition. The second preset condition includes at least one of the following conditions: a serving cell on which the UE currently camps changes; a serving cell on which the UE currently camps is not included in a specified cell set; a serving cell on which the UE currently camps and the first cell do not belong to a same preset region or a same base station; the UE sends the source identifier to the second base station and receives an access rejection instruction corresponding to the source identifier from the second base station; the UE reads a system information broadcast of a second cell, and the system information broadcast does not carry an instruction for permitting access by the UE in the low-overhead state; the UE needs to send uplink data; the UE obtains a reference signal measurement result, and a comparison result between the reference signal measurement result and a predetermined first threshold complies with a preset result; the UE enters the low-overhead state for a predefined time period, and a length of the predefined time period may be a time length specified in the UE or a time length configured by and received from the first base station; and a PLMN of the UE changes.

That the serving cell on which the UE currently camps and the first cell do not belong to a same preset region or a same base station is specifically: determining, by the UE according to region identifiers carried in system information broadcasts of the first cell and the currently camped cell, whether the serving cell on which the UE currently camps and the first cell belong to the same preset region; or determining, by the UE according to base station identifiers carried in system information broadcasts of the first cell and the currently camped cell, whether the serving cell on which the UE currently camps and the first cell belong to the same base station.

The reference signal measurement result includes a path loss, signal strength, or signal quality. The preset result is greater than, less than, equal to, or a combination thereof. The UE obtains the reference signal measurement result, and compares the reference signal measurement result with the predetermined first threshold. If the result complies with the preset result, the UE exits from the low-overhead state. For example, a predetermined path loss is greater than the predetermined first threshold.

That a Public Land Mobile Network, public land mobile network (PLMN) of the UE changes includes that a home PLMN of a cell currently selected by the UE does not belong to a PLMN set currently specified by the UE. Specifically, any PLMN of the current home PLMN does not belong to the PLMN set currently specified by the UE. The PLMN set currently specified by the UE includes any one or a combination of the following: a PLMN with which the UE currently registers, a PLMN selected by the UE, or an equivalent PLMN of the UE.

Further, when satisfying the second preset condition, the UE deletes the connection context and enters an idle state. Further, the UE notifies a higher layer of the UE that the UE has already exited from the low-overhead state. Alternatively, the UE notifies a higher layer of the UE that the UE has already exited from the low-overhead state, and the higher layer of the UE triggers a tracking area update, or the UE triggers a tracking area update. Further, optionally, the UE adds an indication to a tracking area update message. The indication is used to notify the core network that the UE was in the low-overhead state previously, so that the core network triggers connection release of the UE according to the indication.

Further, the UE exits from the low-overhead state when satisfying the second preset condition. The exiting from the low-overhead state includes deleting the stored connection context.

In an optional implementation, the connection context includes a connection configuration parameter between the first base station and the UE. Specifically, the connection context may include a radio bearer configuration of the UE and identifier information of the UE. The radio bearer configuration includes a signaling radio bearer configuration and/or a data radio bearer configuration. The identifier information of the UE may include the source identifier of the UE. Further, the connection context may further include key information, and the key information is used during encrypted transmission or during generation of verification information of the UE.

In an optional implementation, the UE receives radio resource control RRC configuration information sent by the first base station. The RRC configuration information includes an RRC configuration index. The configuration index is used to indicate the RRC configuration information. After the UE enters the low-overhead state when satisfying the preset activation condition, the UE in the low-overhead state uses the RRC configuration information.

In an optional implementation, after the UE enters the low-overhead state when satisfying the preset activation condition, the UE releases the dedicated UE identifier of the UE in the first cell.

In an optional implementation, after the UE enters the low-overhead state when satisfying the preset activation condition, the UE performs paging monitoring by using the source identifier.

It should be noted that the low-overhead state in the present invention is a state of the UE defined in the present invention, and features of the state include storing the connection context and performing cell-reselection-based mobility. The low-overhead state is characterized by low signaling overheads and low power consumption overheads. Therefore, the name "low-overhead state" in the present invention was born. The low-overhead state may be a substate of the connected state or an enhanced state of the idle state. This is not limited in the present invention. For example, the low-overhead state may be the idle state of the UE that stores the connection context, and the UE in the low-overhead state enters the normal idle state after deleting the context. Alternatively, the low-overhead state may be the connected state of the UE that is permitted to perform the cell-reselection-based mobility, and the UE in the low-overhead state enters the normal connected state after stopping performing the cell-reselection-based mobility.

Step S204: After determining that the UE enters the low-overhead state, the first base station stores the connection context of the UE in the connected state.

Specifically, for the first base station side, the preset activation condition includes at least one of the following conditions: the first base station sends, to the UE, the control instruction used to instruct the UE to enter the low-overhead state; the first base station does not transmit data with the UE in the first preset duration; the first base station determines that the timing advance timer (TA timer) of the UE expires, or the first base station determines that a TA timer of the UE expires and that the TA timer does not rerun in the second preset duration; and the first base station determines that the UE does not exit from the discontinuous reception DRX state in the third preset duration after entering the DRX state. The control instruction that is sent by the first base station to the UE and that is used to instruct the UE to enter the low-overhead state may be RRC signaling, MAC layer signaling, or physical layer signaling. The control instruction and the source identifier may be sent to the UE in a same message, or may be sent to the UE in different messages. This is not specifically limited in the present invention.

In an optional implementation, the first base station further sends the radio resource control RRC configuration information to the UE for use by the UE in the low-overhead state. Further, the RRC configuration information includes the RRC configuration index. The configuration index is used to indicate the RRC configuration information. Optionally, the RRC configuration includes the radio bearer configuration of the UE when the UE is in the low-overhead state. The radio bearer configuration includes the signaling radio bearer configuration and/or the data radio bearer configuration. Further, optionally, the RRC configuration may further include the key information, and the key information is used during the encrypted transmission.

Step S205: When the UE satisfies a first preset condition, the UE reports the source identifier to the second base station to which a second cell belongs, where the second cell is a serving cell on which the UE currently camps.

Specifically, the first preset condition includes: the serving cell on which the UE currently camps changes; the second cell on which the UE currently camps is not included in a specified cell set; the second cell on which the UE currently camps and the first cell do not belong to a same preset region or a same base station; or the UE needs to send uplink data.

In an optional implementation, before the UE reports, when satisfying the first preset condition, the source identifier to the second base station, the UE receives and reads a system information broadcast of the second cell. If the system information broadcast carries an instruction for permitting access by the UE in the low-overhead state, the UE determines, according to the access instruction, to send the source identifier to the second base station.

In an optional implementation, before the UE reports, when satisfying the first preset condition, the source identifier to the second base station, the UE determines, according to the reference signal measurement result, to report the source identifier. The reference signal measurement result includes the path loss, the signal quality, or the signal strength. The UE compares the reference signal measurement result and the predetermined first threshold and determines, according to the comparison result, whether to report the source identifier. The predetermined first threshold may be a preset fixed value or a threshold configured by a base station for the UE. For example, if the reference signal measurement result is the path loss, the UE can report the source identifier only after determining that the path loss is less than the predetermined first threshold. Otherwise, if the UE exits from the low-overhead state, the UE deletes the stored context.

In an optional implementation, before the UE reports, when satisfying the first preset condition, the source identifier to the second base station, the UE sends a random access preamble within a preset range to the second base station, receives a transmission resource with a preset size that is allocated by the second base station and that is used to transmit the source identifier, and uses the transmission resource to send the source identifier to the second base station, where the random access preamble within the preset range is used to indicate that the source identifier needs to be sent to the second base station or that a message whose size is greater than a preset length threshold needs to be sent to the second base station. Further, the random access preamble within the preset range is a predefined preamble or a preamble configured by and received from the second base station.

In an optional implementation, that the UE reports the source identifier to the second base station may be specifically: reporting, by the UE, the source identifier including the RRC configuration index to the second base station, so that the second base station determines, according to the RRC configuration index, the RRC configuration information used by the UE.

In an optional implementation, that the UE reports the source identifier to the second base station may be specifically: sending, by the UE, a random access preamble to the second base station; receiving a dedicated UE identifier sent by the second base station and a transmission resource that is allocated according to the random access preamble and that is used to transmit the source identifier, where the dedicated UE identifier is an identifier used to uniquely identify the UE in the second cell; using the transmission resource to send the source identifier to the second base station; receiving acknowledgement information that includes the source identifier and that is sent by the second base station; and determining, according to the acknowledgement information, whether to apply the dedicated UE identifier. Further, that the UE determines, according to the acknowledgement information, whether to apply the dedicated UE identifier is specifically: skipping applying, by the UE, the dedicated UE identifier according to the acknowledgement information; applying, by the UE, the dedicated UE identifier according to the acknowledgement information, and exiting from the low-overhead state; applying, by the UE, the dedicated UE identifier according to the acknowledgement information, and remaining in the low-overhead state; or applying, by the UE according to an instruction that is carried in the acknowledgement information and that is used to instruct the UE to exit from the low-overhead state, the dedicated UE identifier and exiting from the low-overhead state. Further, after applying the dedicated UE identifier, the UE updates a key in the connection context according to a cell identifier of the serving cell that is currently camped on. Further, the source identifier reported by the UE to the second base station further includes the verification information. The verification information is identity check information generated by the UE according to the source identifier and the updated key.

In an optional implementation, the source identifier reported by the UE further includes indication information. The indication information is used to notify the second base station that the UE is in the low-overhead state.

In an optional implementation, that the UE reports the source identifier to the second base station may be specifically as follows: The source identifier includes a long source identifier and a short source identifier. The UE determines, according to indication information or the reference signal measurement result of the second base station, to report the long source identifier or the short source identifier. The long source identifier and the short source identifier may be two separate source identifiers, or the short source identifier is some information of the long source identifier. For example, a length of the long source identifier is N bits, and the short source identifier may be M bits in the N bits, where M is less than N. The indication information of the second base station may be indication information configured by using a system information broadcast or may be authorization information sent to the UE by using an authorization command. Specifically, the indication information configured by using the system information broadcast may be an indication used to instruct the UE to use the long source identifier or the short source identifier. The UE may determine, according to the indication, a source identifier type used to report the source identifier. Alternatively, the indication information is the authorization information that is sent to the UE by using the authorization command. The UE determines, according to the authorization information, a size of a transmissible message, and chooses, according to the size of the transmissible message, to use the long source identifier or the short source identifier. For example, if the authorization information is 56 bits and 25 bits may be used for filling the source identifier, the short source identifier is chosen; alternatively, if the authorization information is 88 bits and 40 bits may be used for filling the source identifier, the long source identifier is chosen. That the UE determines, according to the reference signal measurement result, to report the long source identifier or the short source identifier includes the following steps: The reference signal measurement result includes the path loss, the signal quality, or the signal strength, and the UE compares the reference signal measurement result and the predetermined first threshold, and determines, according to the comparison result, to report the long source identifier or the short source identifier. The predetermined first threshold may be the preset fixed value or the threshold configured by the base station for the UE.

In an optional implementation, that the UE reports the source identifier to the second base station may be specifically as follows: The source identifier includes the long source identifier and the short source identifier. The UE determines to first report the short source identifier and then report the long source identifier or remaining content of the long source identifier except the short source identifier in a subsequent message according to an indication of the second base station. After receiving the short source identifier, the second base station determines the first base station according to the short source identifier, sends a context transfer request to the first base station, and if the context cannot be obtained, instructs the UE to report the long source identifier or the remaining content of the long source identifier except the short source identifier. In this way, first reporting the long source identifier can be avoided. The short source identifier is some information of the long source identifier. For example, a length of the long source identifier is N bits, and the short source identifier may be M bits. For example, the short source identifier may be N least significant bits of the long source identifier or N most significant bits of the long source identifier. M is less than N.

It should be noted that starting, by the UE, a cell reselection process after entering the low-overhead state depends on whether the UE moves. When the UE satisfies the first preset condition, the serving cell may still be the first cell or may be another cell different from the first cell. Therefore, the second cell and the first cell may be a same cell or may be different cells.

Step S206: The second base station to which the second cell belongs receives the source identifier reported by the user equipment (UE) in the low-overhead state.

Specifically, a first cell is a serving cell of the UE when the UE enters the low-overhead state, and a second cell is the current serving cell of the UE. The source identifier includes the first UE identifier used to identify the UE in the first base station to which the first cell belongs.

In an optional implementation, before the second base station receives the source identifier reported by the user equipment (UE) in the low-overhead state, the second base station sends the system information broadcast. The system information broadcast carries the instruction for permitting access by the UE in the low-overhead state, so that the UE determines, according to the access instruction, whether to send the source identifier to the second base station. Specifically, the second base station controls, by using the system information broadcast, whether to permit access by the UE in the low-overhead state. Therefore, the UE determines, by determining the instruction carried in the broadcast, whether the source identifier can be reported.

In an optional implementation, before receiving the source identifier reported by the user equipment (UE) in the low-overhead state, the second base station receives a random access preamble sent by the UE, and allocates a transmission resource with a preset size to the UE when the random access preamble is within a preset range, so that the UE uses the transmission resource to send the source identifier. Further, the random access preamble within the preset range is a predefined preamble or a preamble configured by and received from the second base station.

In an optional implementation, that the second base station receives the source identifier reported by the user equipment (UE) in the low-overhead state is specifically: receiving, by the second base station to which the second cell belongs, a random access preamble sent by the user equipment (UE) in the low-overhead state; allocating, to the UE according to the random access preamble, a dedicated UE identifier and a transmission resource used to transmit the source identifier, where the dedicated UE identifier is an identifier used to uniquely identify the UE in the second cell; using the transmission resource to receive the source identifier; and sending acknowledgement information including the source identifier to the UE. Further, that the second base station sends acknowledgement information including the source identifier to the UE is specifically: sending, by the second base station to the UE, an acknowledgement message that includes the source identifier and that carries an instruction used to instruct the UE to exit from the low-overhead state, so that the UE applies the dedicated UE identifier and exits from the low-overhead state according to the instruction.

In an optional implementation, the source identifier that is reported by the UE and received by the second base station further includes a radio resource control RRC configuration index, and after receiving the source identifier reported by the UE in the low-overhead state, the second base station determines, according to the RRC configuration index, RRC configuration information used by the UE.

Step S207: The second base station sends the first UE identifier to the first base station according to the source identifier, to instruct the first base station to learn that the current serving cell of the UE is the second cell.

Specifically, the second base station sends the source identifier to the first base station according to the source identifier by using an inter-base station interface between the second base station and the first base station, or sends the source identifier to the first base station according to the source identifier by using a core network.

In an optional implementation, the second base station sends a notification message to the first base station according to the source identifier. The notification message carries the source identifier of the UE and a second cell identifier of the second cell in which the UE is currently located, and the second cell is the serving cell on which the UE currently camps. The first base station receives the notification message sent by the second base station, and determines, according to the source identifier and the second cell identifier, that the serving cell on which the UE currently camps is the second cell. Further, the notification message carries verification information of the UE. The verification information is identity check information generated by the UE according to the source identifier and a key included in the connection context. The first base station determines, according to the source identifier and the verification information, whether the UE is authorized UE.

In an optional implementation, after sending the first UE identifier to the first base station according to the source identifier, the second base station receives the connection context and the source identifier of the UE that are sent by the first base station, determines configuration information of the UE according to the received connection context and source identifier, and triggers uplink access by the UE according to the source identifier.

In this embodiment of the present invention, an interaction process implemented in the present invention imposes no limitation to simultaneously performing all steps. That is, processing steps of the UE, the first base station, and the second base station may be performed inside the UE device, the first base station device, and the second base station device, respectively. Separate implementation of any device, including the UE, the first base station, and the second base station, shall fall within the protection scope of the embodiments of the present invention.

In this embodiment of the present invention, the low-overhead state is designed, so that the UE in this state stores the connection context of the UE in the connected state and camps on the cell according to the cell reselection criterion in the moving process. In addition, the UE in the low-overhead state receives a source identifier sent by a source base station, and reports the source identifier to a current serving base station of the UE in the moving process when a specified condition is satisfied. Finally, the serving base station sends the source identifier to the source base station. In this way, both the serving base station and the source base station can learn of location information of the UE. That is, after the UE enters the low-overhead state, the UE autonomously performs cell-reselection-based mobility, and reports only location change information of the UE, thereby simplifying a handover process, and saving a communications resource of a network device.

Figure 3A:
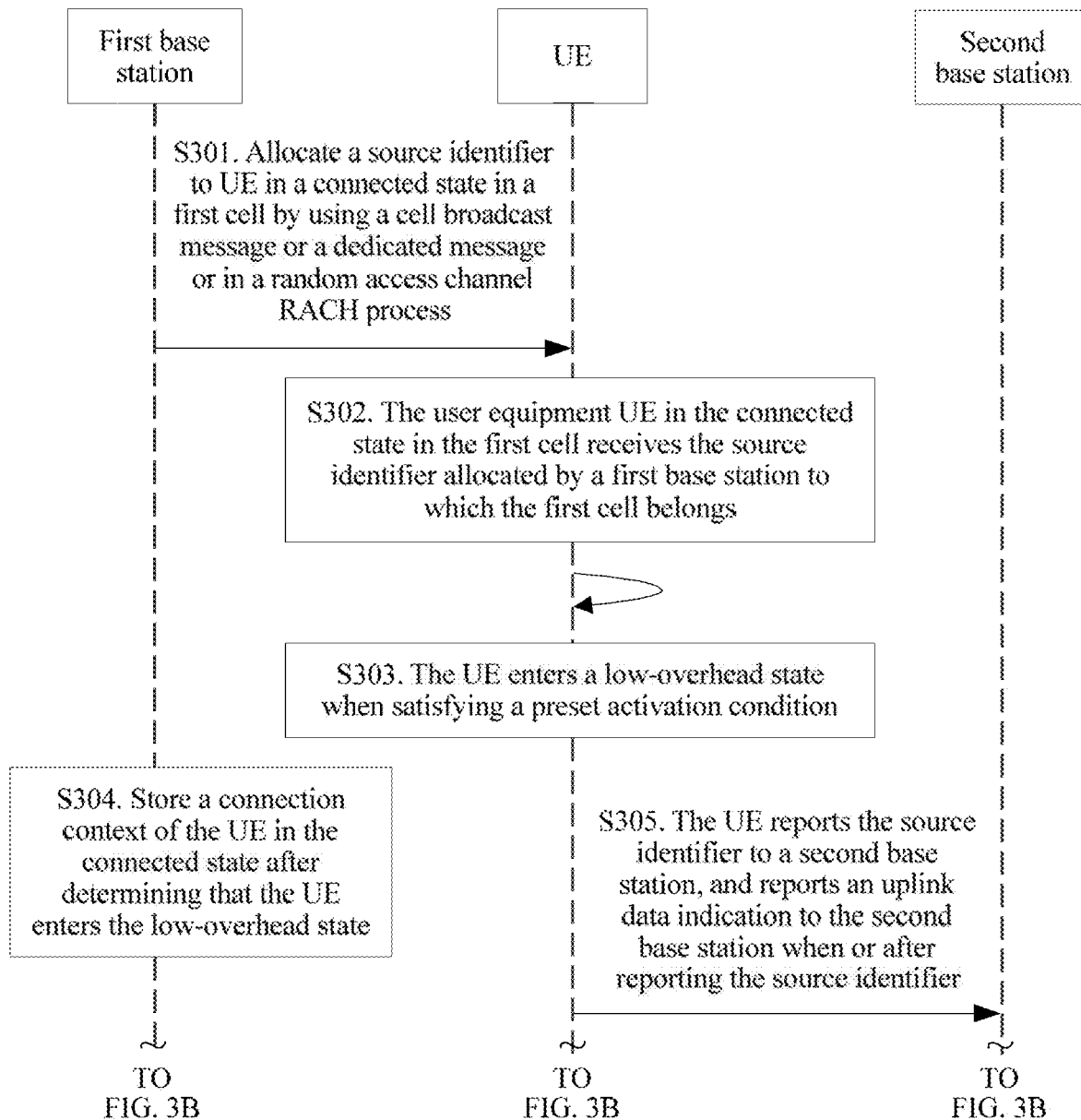
FIG. 3A and FIG. 3B are a schematic flowchart of another mobility management method according to embodiments of the present invention.
Figure 3B:
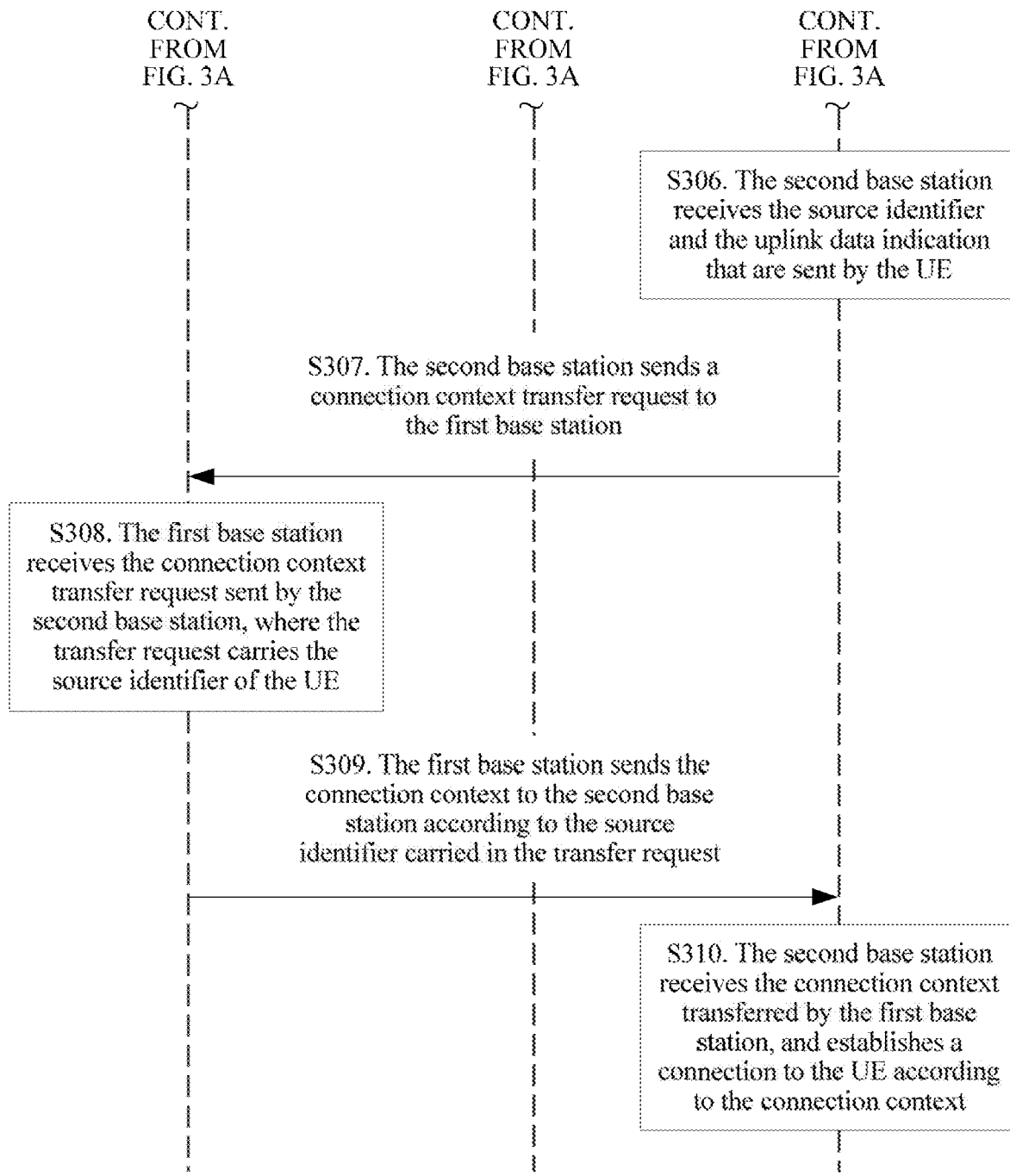

Referring to FIG. 3A and FIG. 3B, FIG. 3A and FIG. 3B are a schematic flowchart of another mobility management method according to an embodiment of the present invention. The following provides descriptions from a perspective of interaction between a first base station, UE, and a second base station with reference to FIG. 3A and FIG. 3B. As shown in FIG. 3A and FIG. 3B, the method may include the following steps S301 to S310.

Step S301: The first base station to which a first cell belongs allocates a source identifier to the UE in a connected state in the first cell by using a cell broadcast message or a dedicated message or in a random access channel (RACH) process.

Step S302: The user equipment (UE) in the connected state in the first cell receives the source identifier allocated by the first base station to which the first cell belongs, where the source identifier includes a first UE identifier used to uniquely identify the UE in the first base station.

Step S303: The UE enters a low-overhead state when satisfying a preset activation condition, and the UE in the low-overhead state stores a connection context of the UE in the connected state and camps on a cell according to a cell reselection criterion in a moving process.

Step S304: After determining that the UE enters the low-overhead state, the first base station stores the connection context of the UE in the connected state, where the UE enters the low-overhead state when satisfying the preset activation condition, and the UE in the low-overhead state stores the connection context and camps on the cell according to the cell reselection criterion in the moving process.

Specifically, for step S301 to step S304, refer to step S201 to step S204 in the foregoing embodiment in FIG. 2 correspondingly. Details are not described herein again.

Step S305: This step includes processing in step 205 when the first preset condition is that the UE needs to send the uplink data, and that the UE reports the source identifier to the second base station to which a second cell belongs further includes: reporting, by the UE when or after reporting the source identifier, an uplink data indication to the second base station to which the second cell belongs.

Specifically, the source identifier and the uplink data indication may be carried in a same report message or in different report messages. The report message may be an RRC message, a MAC control information element, or a physical layer control message. The uplink data indication may be an indication of one bit used to indicate that data of the UE reaches or indicate a data volume.

Step S306: The second base station receives the source identifier and the uplink data indication that are sent by the UE.

Step S307: The second base station sends a connection context transfer request to the first base station, where the connection context is the connection context of the UE in the connected state that is stored by the first base station when the UE enters the low-overhead state, and the connection context transfer request carries the source identifier of the UE.

Step S308: The first base station receives the connection context transfer request sent by the second base station to which the second cell belongs, where the transfer request carries the source identifier of the UE, and the second cell is a cell on which the UE currently camps.

Step S309: The first base station sends the connection context to the second base station according to the source identifier carried in the transfer request.

In an optional implementation, after the first base station sends the connection context to the second base station, the first base station further sends, to the second base station, an indication for handing over a core network data path, so that the second base station determines whether the core network data path is handed over to the second base station.

In an optional implementation, before, when, or after the first base station sends the connection context to the second base station, the first base station sends a paging parameter to the second base station, where the paging parameter includes a paging index of the UE or a DRX cycle of the UE; and the second base station may trigger paging to the UE according to the paging parameter.

Step S310: The second base station receives the connection context transferred by the first base station, and establishes a connection to the UE according to the connection context.

In an optional implementation, the second base station determines configuration information of the UE according to the received connection context with reference to the source identifier, and triggers uplink access by the UE according to the source identifier. Further, the triggering uplink access by the UE according to the source identifier is specifically: initiating paging to the UE by using the source identifier; determining a dedicated UE identifier of the UE according to the source identifier, and sending an uplink access command to the UE by using the dedicated UE identifier; or determining a dedicated UE identifier of the UE according to the source identifier, and initiating paging to the UE by using the dedicated UE identifier.

In an optional implementation, after receiving the connection context transferred by the first base station, the second base station further sends a re-allocated source identifier to the UE, and sends, to the UE, an instruction used to instruct the UE to exit from the low-overhead state, where the re-allocated source identifier includes a second UE identifier used to identify the UE in the second base station.

In this embodiment of the present invention, an interaction process implemented in the present invention imposes no limitation to simultaneously performing all steps. That is, processing steps of the UE, the first base station, and the second base station may be performed inside the UE device, the first base station device, and the second base station device, respectively. Separate implementation of any device, including the UE, the first base station, and the second base station, shall fall within the protection scope of the embodiments of the present invention.

In this embodiment of the present invention, the low-overhead state is designed, so that the UE in this state stores the connection context of the UE in the connected state and camps on the cell according to the cell reselection criterion in the moving process. In addition, the UE in the low-overhead state receives a source identifier sent by a source base station, and reports the source identifier to a current serving base station of the UE in the moving process when a specified condition is satisfied. Finally, the serving base station sends the source identifier to the source base station. In this way, both the serving base station and the source base station can learn of location information of the UE. That is, after the UE enters the low-overhead state, the UE autonomously performs cell-reselection-based mobility, and reports only location change information of the UE, thereby simplifying a handover process, and saving a communications resource of a network device. Further, after the UE enters the low-overhead state, both the source base station and the UE store the connection context of the UE. Therefore, when the UE needs to perform uplink or downlink data communication, the connection context of the UE can be handed over to the current serving base station of the UE, and further data is transmitted, thereby ensuring data transmission efficiency.

Figure 4A:
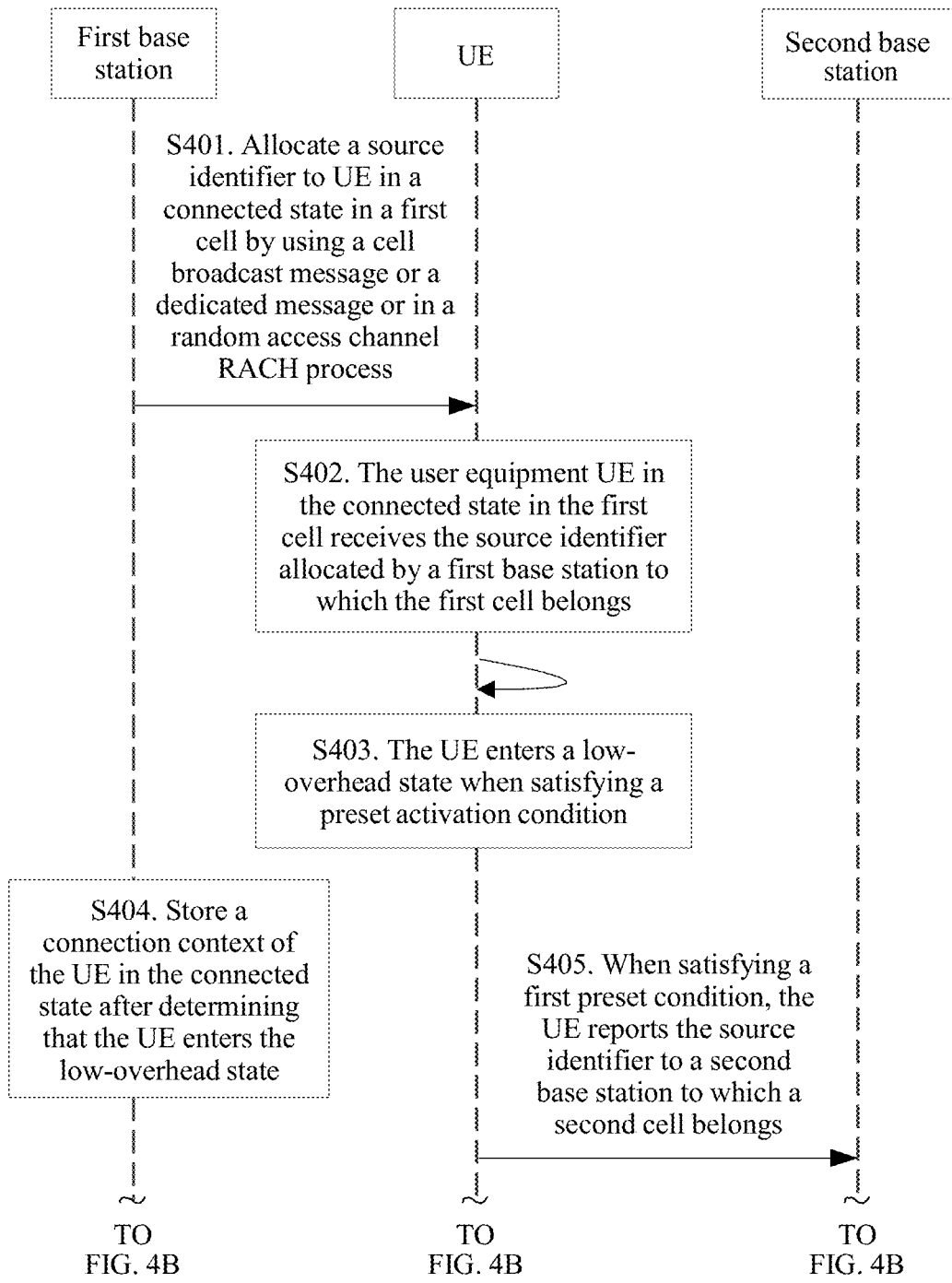
FIG. 4A and FIG. 4B are a schematic flowchart of still another mobility management method according to embodiments of the present invention.
Figure 4B:
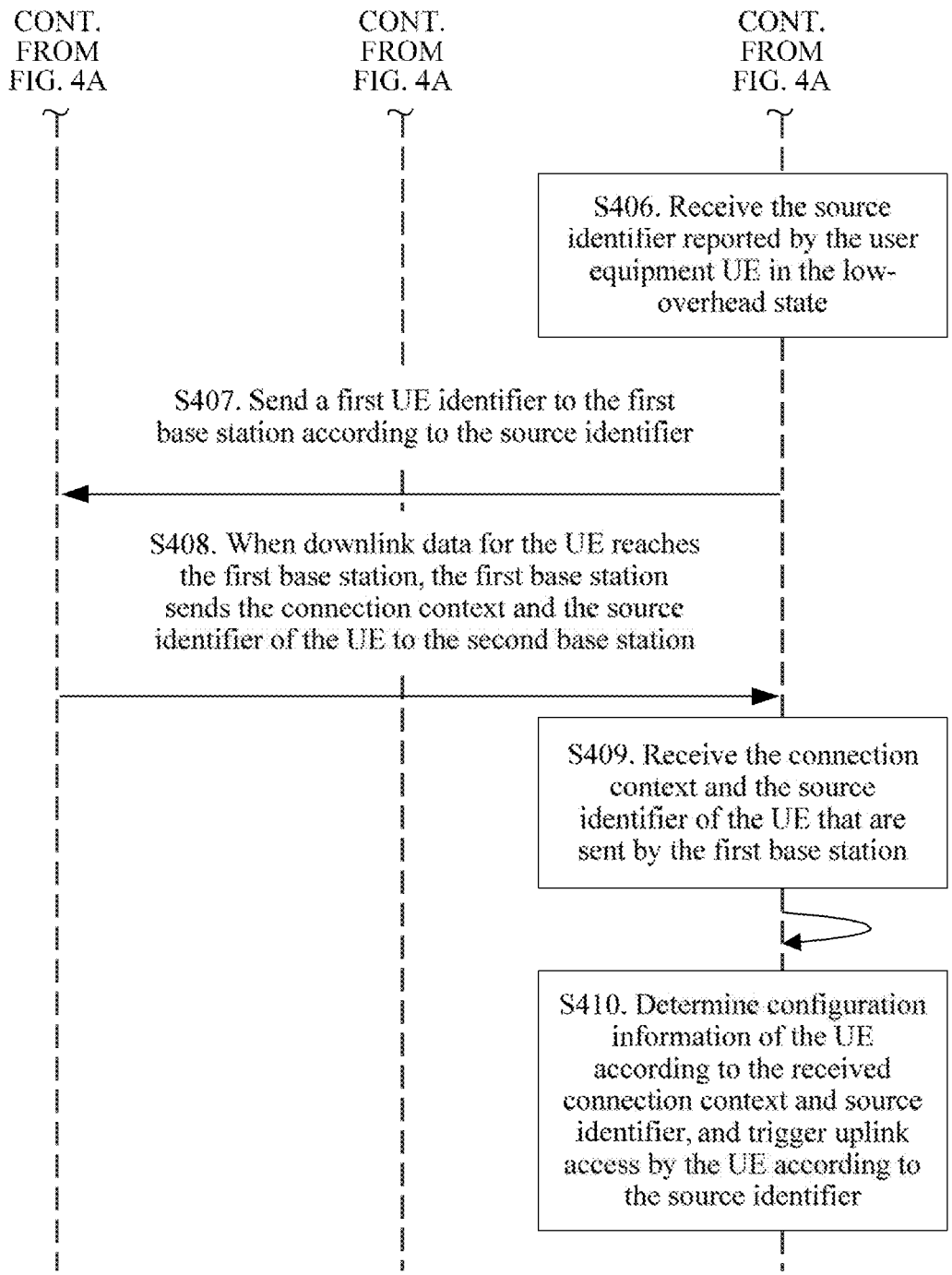

Referring to FIG. 4A and FIG. 4B, FIG. 4A and FIG. 4B are a schematic flowchart of still another mobility management method according to an embodiment of the present invention. The following provides descriptions from a perspective of interaction between a first base station, UE, and a second base station with reference to FIG. 4A and FIG. 4B. As shown in FIG. 4A and FIG. 4B, the method may include the following steps S401 to S410.

Step S401: The first base station to which a first cell belongs allocates a source identifier to the UE in a connected state in the first cell by using a cell broadcast message or a dedicated message or in a random access channel (RACH) process.

Step S402: The user equipment (UE) in the connected state in the first cell receives the source identifier allocated by the first base station to which the first cell belongs, where the source identifier includes a first UE identifier used to uniquely identify the UE in the first base station.

Step S403: The UE enters a low-overhead state when satisfying a preset activation condition, and the UE in the low-overhead state stores a connection context of the UE in the connected state and camps on a cell according to a cell reselection criterion in a moving process.

Step S404: After determining that the UE enters the low-overhead state, the first base station stores the connection context of the UE in the connected state, where the UE in the low-overhead state stores the connection context and camps on the cell according to the cell reselection criterion in the moving process.

Step S405: When satisfying a first preset condition, the UE reports the source identifier to the second base station to which a second cell belongs, where the second cell is a serving cell on which the UE currently camps.

Step S406: The second base station to which the second cell belongs receives the source identifier reported by the user equipment (UE) in the low-overhead state, where the UE in the low-overhead state stores the connection context of the UE in the connected state and camps on the cell according to the cell reselection criterion in the moving process, a first cell is a serving cell of the UE when the UE enters the low-overhead state, a second cell is the current serving cell of the UE, and the source identifier includes the first UE identifier used to identify the UE in the first base station to which the first cell belongs.

Step S407: The second base station sends the first UE identifier to the first base station according to the source identifier.

Specifically, for step S401 to step S407, refer to step S201 to step S207 in the foregoing embodiment in FIG. 2 correspondingly. Details are not described herein again.

Step S408: When downlink data for the UE reaches the first base station, the first base station sends the connection context and the source identifier of the UE to the second base station, where the second base station is a base station to which the second cell belongs.

Specifically, when the downlink data for the UE reaches the first base station, the first base station sends the connection context and the source identifier of the UE to the second base station, so that the second base station performs data communication with the UE according to the connection context. In addition, the first base station further forwards the downlink data for the UE to the second base station, so that the second base station, as a current serving base station of the UE, can send the downlink data to the UE.

Step S409: Receive the connection context and the source identifier of the UE that are sent by the first base station.

Step S410: Determine configuration information of the UE according to the received connection context and source identifier, and trigger uplink access by the UE according to the source identifier.

Specifically, for step S409 to step S410, refer to step S207 in the foregoing embodiment in FIG. 2 correspondingly. Details are not described herein again.

In this embodiment of the present invention, an interaction process implemented in the present invention imposes no limitation to simultaneously performing all steps. That is, processing steps of the UE, the first base station, and the second base station may be performed inside the UE device, the first base station device, and the second base station device, respectively. Separate implementation of any device, including the UE, the first base station, and the second base station, shall fall within the protection scope of the embodiments of the present invention.

In this embodiment of the present invention, the low-overhead state is designed, so that the UE in this state stores the connection context of the UE in the connected state and camps on the cell according to the cell reselection criterion in the moving process. In addition, the UE in the low-overhead state receives a source identifier sent by a source base station, and reports the source identifier to a current serving base station of the UE in the moving process when a specified condition is satisfied. Finally, the serving base station sends the source identifier to the source base station. In this way, both the serving base station and the source base station can learn of location information of the UE. That is, after the UE enters the low-overhead state, the UE autonomously performs cell-reselection-based mobility, and reports only location change information of the UE, thereby simplifying a handover process, and saving a communications resource of a network device. Further, after the UE enters the low-overhead state, both the source base station and the UE store the connection context of the UE. Therefore, when the UE needs to perform uplink or downlink data communication, the connection context of the UE can be handed over to the current serving base station of the UE, and further data is transmitted, thereby ensuring data transmission efficiency.

Figure 8A:
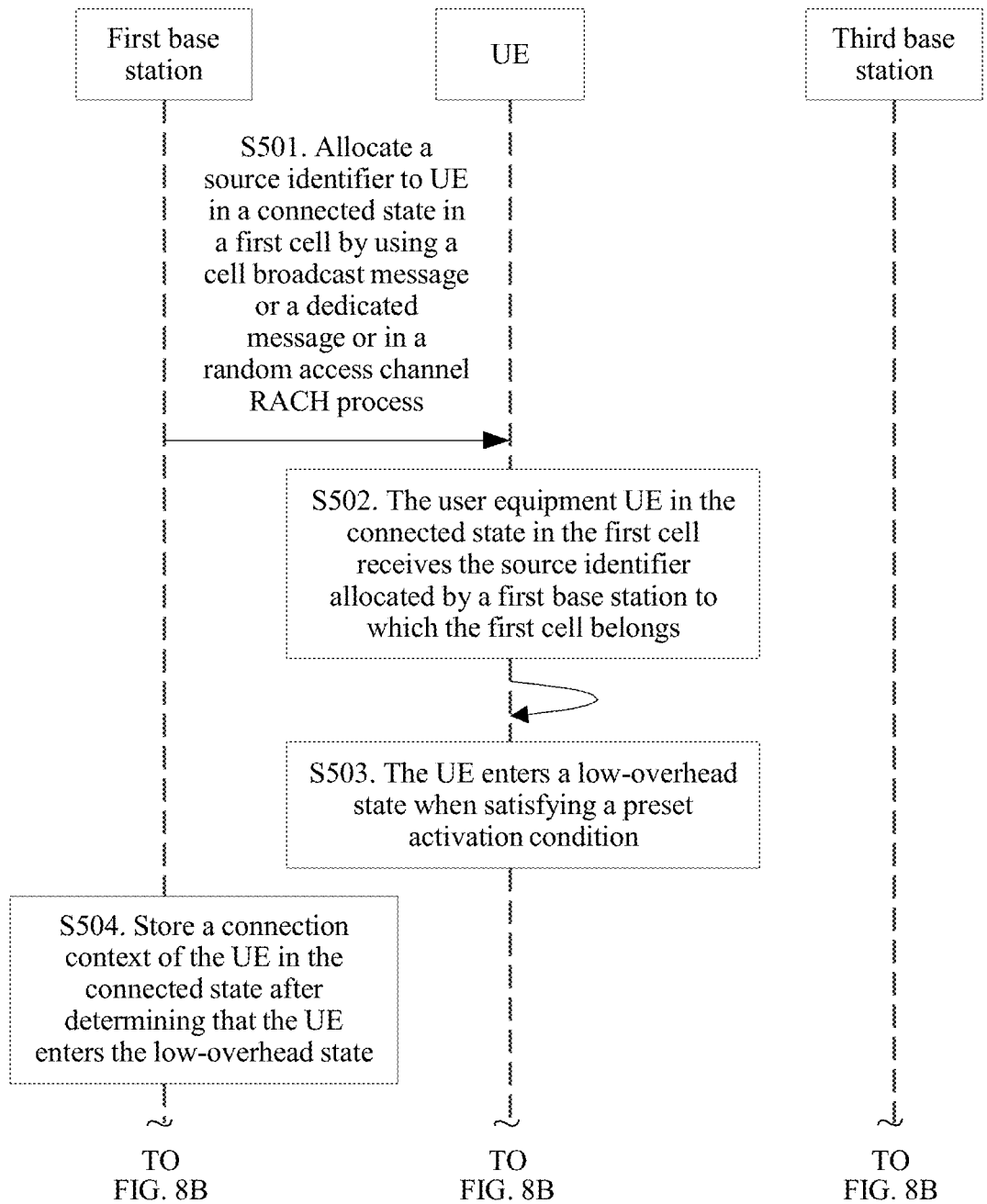
FIG. 8A and FIG. 8B are a schematic flowchart of still another mobility management method according to embodiments of the present invention.
Figure 8B:
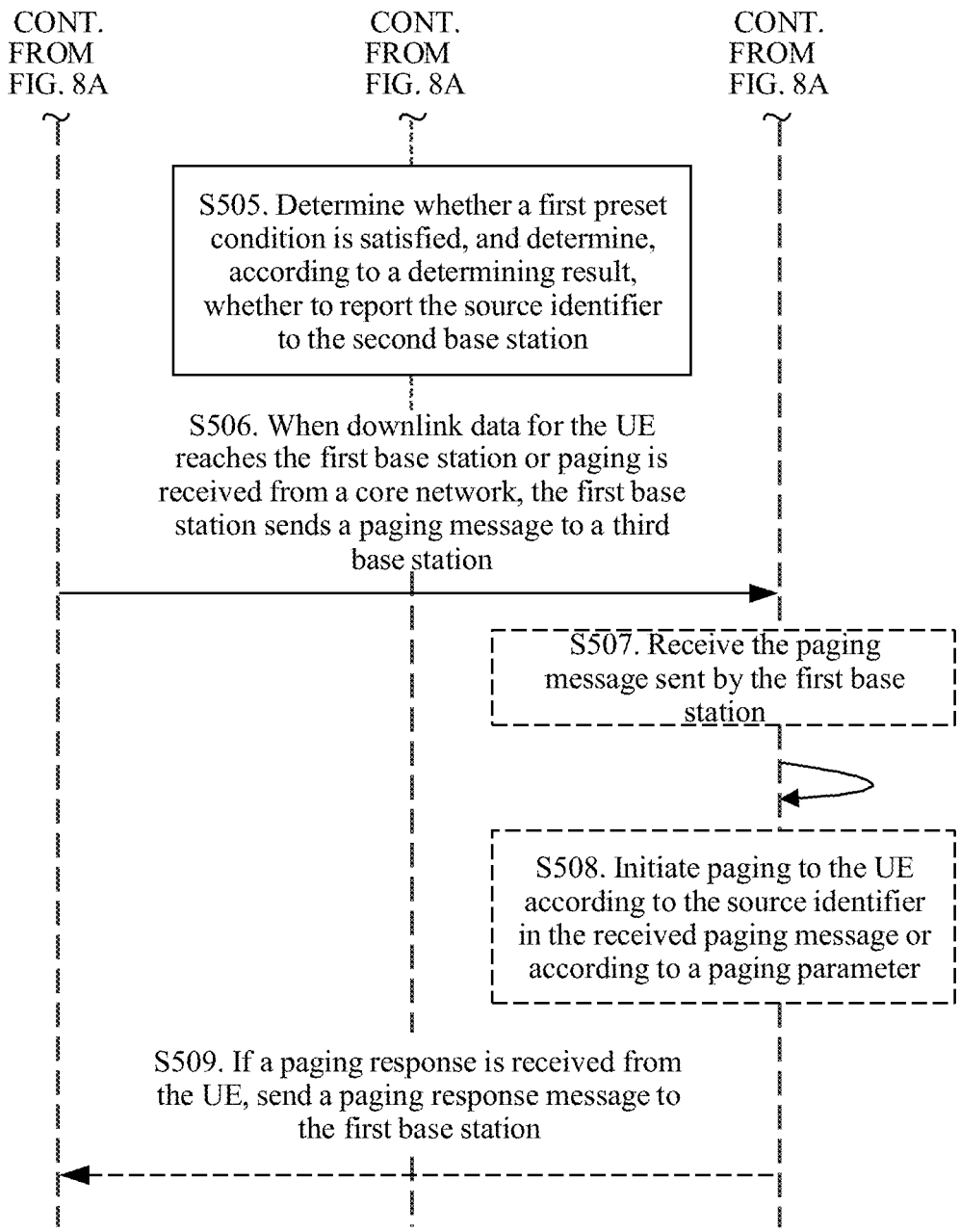

Referring to FIG. 8A and FIG. 8B, FIG. 8A and FIG. 8B are a schematic flowchart of still another mobility management method according to an embodiment of the present invention. The following provides descriptions from a perspective of interaction between a first base station, UE, and a third base station with reference to FIG. 8A and FIG. 8B. As shown in FIG. 8A and FIG. 8B, the method may include the following steps S501 to S506.

Step S501: The first base station to which a first cell belongs allocates a source identifier to the UE in a connected state in the first cell by using a cell broadcast message or a dedicated message or in a random access channel (RACH) process.

Step S502: The user equipment (UE) in the connected state in the first cell receives the source identifier allocated by the first base station to which the first cell belongs, where the source identifier includes a first UE identifier used to uniquely identify the UE in the first base station.

Step S503: The UE enters a low-overhead state when satisfying a preset activation condition, and the UE in the low-overhead state stores a connection context of the UE in the connected state and camps on a cell according to a cell reselection criterion in a moving process.

Step S504: After determining that the UE enters the low-overhead state, the first base station stores the connection context of the UE in the connected state, where the UE in the low-overhead state stores the connection context and camps on the cell according to the cell reselection criterion in the moving process.

Step S505: When satisfying a first preset condition, the UE reports the source identifier to a second base station to which a second cell belongs, where the second cell is a serving cell on which the UE currently camps.

Specifically, for step S501 to step S505, refer to step S201 to step S205 in the foregoing embodiment in FIG. 2 correspondingly. Details are not described herein again.

Step S506: When downlink data for the UE reaches the first base station or a first paging message from a core network device reaches the first base station, the first base station sends a second paging message to the third base station, where the third base station is a base station that belongs to a same paging region as the first base station.

Optionally, the UE in the low-overhead state may move in a specified region according to a configuration without notifying the base station. In this case, the first base station cannot know an accurate location of the UE and only can perform paging to the UE in the specified region. Specifically, for the UE in step S505, when the UE satisfies the first preset condition, the UE reports the source identifier to the second base station to which the second cell belongs. The first preset condition includes: the second cell on which the UE currently camps is not included in a specified cell set; or the second cell on which the UE currently camps and the first cell do not belong to a same preset region or a same base station. When the UE moves in the cell set or the same preset region, the UE may not send the UE identifier to the second base station. Therefore, the first base station cannot know a specific cell, in which the UE is located, within the cell set or within the preset region. The cell set or the preset region is defined as a paging region. The cell set is configured by the base station for the UE when the UE enters the low-overhead state. The preset region is a region in which the home serving cell of the UE is located when the UE enters the low-overhead state. Therefore, the first base station needs to send the second paging message to the third base station. The third base station sends paging to the UE according to the second paging message. If the third base station receives a paging response message of the UE, the third base station returns a second paging response message to the first base station. The first base station may know, according to the second paging response message, that the UE currently belongs to the third base station, and may further trigger the third base station to send a context of the UE. In addition, the first base station also sends paging to the UE, so as to determine whether the UE belongs to the first base station.

Optionally, in an optional implementation, the first base station determines to release the UE, the first base station sends a connection release indication to the second base station, and the second base station may perform a connection release operation on the UE according to the connection release indication. The connection release indication may be carried in the second paging message or the connection release indication is carried in a context transfer message sent by the first base station to the second base station. The second base station adds, according to the connection release indication, the release indication to a paging parameter sent to the UE, or the second base station instructs, when receiving a connection resume request of the UE, the UE to release a connection. The instructing the UE to release a connection may be specifically sending a connection rejection message to the UE. The rejection message is used to instruct the UE to delete the stored connection context. The connection release indication may further carry a connection release reason. The second base station adds, according to the connection release reason, the release reason to a paging parameter sent to the UE, or the second base station adds, according to the connection release reason, the release reason to the connection rejection message sent to the UE. The connection release reason may be specifically a tracking area update for load balance, a circuit domain fallback request, resource releasing, or an encryption/decryption failure. The connection release indication may further carry a state of the UE that requires to be released. The second base station adds, according to the state of the UE that requires to be released, the state of the UE that requires to be released to the paging parameter sent to the UE, so that the UE determines, according to the state of the UE, whether to release the connection. The determining, by the first base station, to release the UE includes receiving, by the first base station, a connection release request sent from the core network or determining, by the first base station according to load, that the UE needs to be released.

Specifically, optionally, the base station triggers paging according to the reached downlink data. Before reaching of the downlink data, the base station needs to obtain information about a paging parameter of the UE from the core network. The paging parameter includes a paging index of the UE or a DRX cycle of the UE. The paging index of the UE may be a UE index value calculated according to an international mobile subscriber identity (IMSI) of the UE, and the paging index is used by the base station to calculate a paging occasion of the UE. For example, according to the TS 36.304 rule in the 3GPP protocol, the paging index of the UE is IMSI mod 1024. The paging index may be obtained by performing a modulo operation on the IMSI and another value. This is not limited herein. The paging parameter is used to calculate a paging offset of the UE. The DRX cycle is a DRX cycle configured by a UE higher layer. A specific message used by the base station to obtain the information about the paging parameter of the UE from the core network may be an initial context establishment message, a context modification message, an E-RAB establishment message, an E-RAB modification message, or a handover message. The handover message is a message, such as a handover request message or a path handover message, which is sent from the core network to an access network in a handover process of the UE and that is used to indicate a related handover.

Optionally, after the base station obtains the information about the paging parameter of the UE from the core network, if a serving base station of the UE changes, the base station needs to send the paging parameter of the UE to the target serving base station after the change. Specifically, if the UE is in the connected state when the serving base station changes, the base station adds the paging parameter to the handover message, and sends the handover message to the target serving base station of the UE. Alternatively, if the UE in the low-overhead state is in the connected state when the serving base station changes, the base station adds the paging parameter to the context transfer message, and sends the context transfer message to the target serving base station of the UE.

Specifically, optionally, the first base station triggers paging according to a paging message from the core network device, and the first base station obtains information about a paging parameter of the UE from the paging message. The paging parameter includes a paging index of the UE or a DRX cycle of the UE.

Specifically, optionally, the second paging message sent by the first base station to the third base station includes a paging parameter. The paging parameter includes a paging index of the UE or a DRX cycle of the UE.

Specifically, optionally, the second paging message sent by the first base station to the third base station includes a paging parameter. The paging parameter includes the source identifier of the UE.

In this embodiment of the present invention, an interaction process implemented in the present invention imposes no limitation to simultaneously performing all steps. That is, processing steps of the UE, the first base station, and the third base station may be performed inside the UE device, the first base station device, and the third base station device, respectively. Separate implementation of any device, including the UE, the first base station, and the third base station, shall fall within the protection scope of the embodiments of the present invention.

In this embodiment of the present invention, the low-overhead state is designed, so that the UE in this state stores the connection context of the UE in the connected state and camps on the cell according to the cell reselection criterion in the moving process. That is, after the UE enters the low-overhead state, the UE autonomously performs cell-reselection-based mobility, and reports only location region change information of the UE, thereby simplifying the handover process, and saving a communications resource of a network device. Further, after the UE enters the low-overhead state, both a source base station and the UE store the connection context of the UE. Therefore, when the UE needs to perform uplink or downlink data communication, the connection context of the UE can be handed over to a current serving base station of the UE, and further data is transmitted, thereby ensuring data transmission efficiency.

For ease of better implementing the foregoing method embodiments in the embodiments of the present invention, the present invention further provides a related base station and related user equipment that are used to cooperatively implement the foregoing method embodiments. The following makes detailed descriptions with reference to schematic diagrams of the related base station and the related user equipment shown in FIG. 5, FIG. 6, and FIG. 7 in the present invention.

Figure 5:
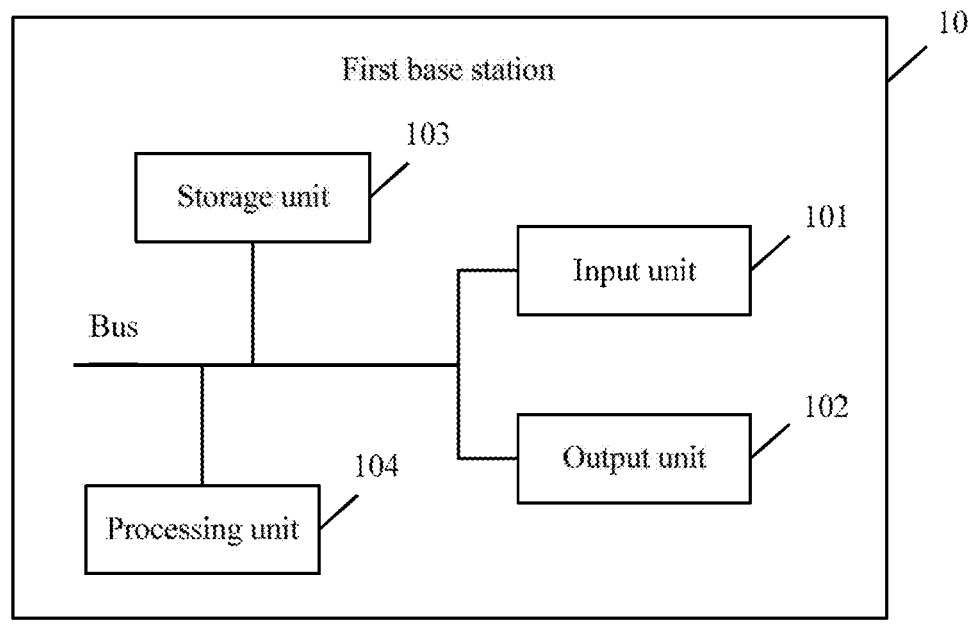
FIG. 5 is a schematic structural diagram of a first base station according to embodiments of the present invention.

Referring to FIG. 5, FIG. 5 shows a base station 10 according to an embodiment of the present invention. The base station 10 is a first base station. The base station 10 includes an output unit 102, a storage unit 103, and a processing unit 104. In some embodiments of the present invention, the input unit 101, the storage unit 103, and the processing unit 104 may be connected by using a bus or in another manner. In FIG. 5, a connection by using a bus is used as an example. The processing unit 104 invokes program code in the storage unit 103, to perform the following operations: allocating, by using the output unit 102, a source identifier to user equipment (UE) in a connected state in a first cell, where the source identifier includes a first UE identifier used to identify the UE in the first base station; and storing a connection context of the UE in the connected state after determining that the UE enters a low-overhead state, where the UE enters the low-overhead state when satisfying a preset activation condition, and the UE in the low-overhead state stores the connection context, and camps on a cell according to a cell reselection criterion in a moving process.

In an optional solution, the source identifier includes a first cell identifier used to identify the first cell and the first UE identifier used to uniquely identify the UE in the first cell, and the first cell identifier includes at least one of a cell universal identifier, a physical cell identifier PCI, and a cell identifier including an identifier of a region and an identifier of the first cell in the region; or the source identifier includes a first base station identifier used to uniquely identify the first base station and the first UE identifier used to uniquely identify the UE in the first base station.

In another optional solution, that the processing unit 104 is configured to allocate, by using the output unit 102, a source identifier to user equipment (UE) in a connected state in a first cell is specifically: allocating the source identifier to the UE in the connected state in the first cell by using a cell broadcast message or a dedicated message that is output by the output unit 102 or in a random access channel (RACH) process.

In another optional solution, the preset activation condition includes at least one of the following conditions: the first base station sends, to the UE, a control instruction used to instruct the UE to enter the low-overhead state; the first base station does not transmit data with the UE in first preset duration; the first base station determines that a timing advance timer TA timer of the UE expires, or the first base station determines that a TA timer of the UE expires and that the TA timer does not rerun in second preset duration; and the first base station determines that the UE does not exit from a discontinuous reception DRX state in third preset duration after entering the DRX state.

In another optional solution, the processing unit 104 is further configured to: send, by using the output unit 102 after determining that the UE enters the low-overhead state, radio resource control RRC configuration information to the UE for use by the UE in the low-overhead state.

In another optional solution, the RRC configuration information includes an RRC configuration index, and the configuration index is used to indicate the RRC configuration information.

In another optional solution, the base station further includes an input unit 101, and the processing unit 104 is further configured to: receive, by using the input unit 101 after determining that the UE enters the low-overhead state, a notification message sent by a second base station to which a second cell belongs, where the notification message carries the source identifier of the UE and a second cell identifier of the second cell in which the UE is currently located, and the second cell is a serving cell on which the UE currently camps; and determine, according to the source identifier and the second cell identifier, that the serving cell on which the UE currently camps is the second cell.

In another optional solution, the processing unit 104 is further configured to: after determining, according to the source identifier and the second cell identifier, that the serving cell on which the UE currently camps is the second cell, send, by using the output unit 102, the connection context and the source identifier of the UE to the second base station when downlink data for the UE reaches the first base station, where the second base station is a base station to which the second cell belongs.

In another optional solution, the base station further includes the input unit 101; the notification message carries verification information of the UE, and the verification information is identity check information generated by the UE according to the source identifier and a key included in the connection context; and the processing unit 104 is further configured to: determine, by using the input unit 101 according to the source identifier and the verification information after receiving the notification message sent by the second base station, whether the UE is authorized UE.

In another optional solution, the base station further includes an input unit 101, and the processing unit 104 is further configured to: receive, by using the input unit 101 after determining that the UE enters the low-overhead state, a connection context transfer request sent by a second base station to which a second cell belongs, where the transfer request carries the source identifier of the UE, and the second cell is a cell on which the UE currently camps; and send, by using the output unit 102, the connection context to the second base station according to the source identifier carried in the transfer request.

In another optional solution, the base station further includes the input unit 101 and the processing unit 104, and the output unit 102 is further configured to: send, by the first base station, a paging message to a third base station by using the output unit 102 when downlink data for the UE reaches the first base station or paging from a core network device reaches the first base station, where the third base station is a base station that belongs to a same paging region as the first base station.

The input unit 101 is configured to receive a paging response message of the UE from the third base station, and the first base station may know, according to the paging response message, that the UE currently belongs to the third base station.

The input unit 101 is further configured to: before the downlink data reaches the base station, the base station needs to obtain information about a paging parameter of the UE from a core network. The paging parameter includes a paging index of the UE or a DRX cycle of the UE.

It may be understood that for functions of units in the base station 10, reference may be made to specific corresponding implementations in the foregoing method embodiment in FIG. 2. Details are not described herein again.

Figure 6:
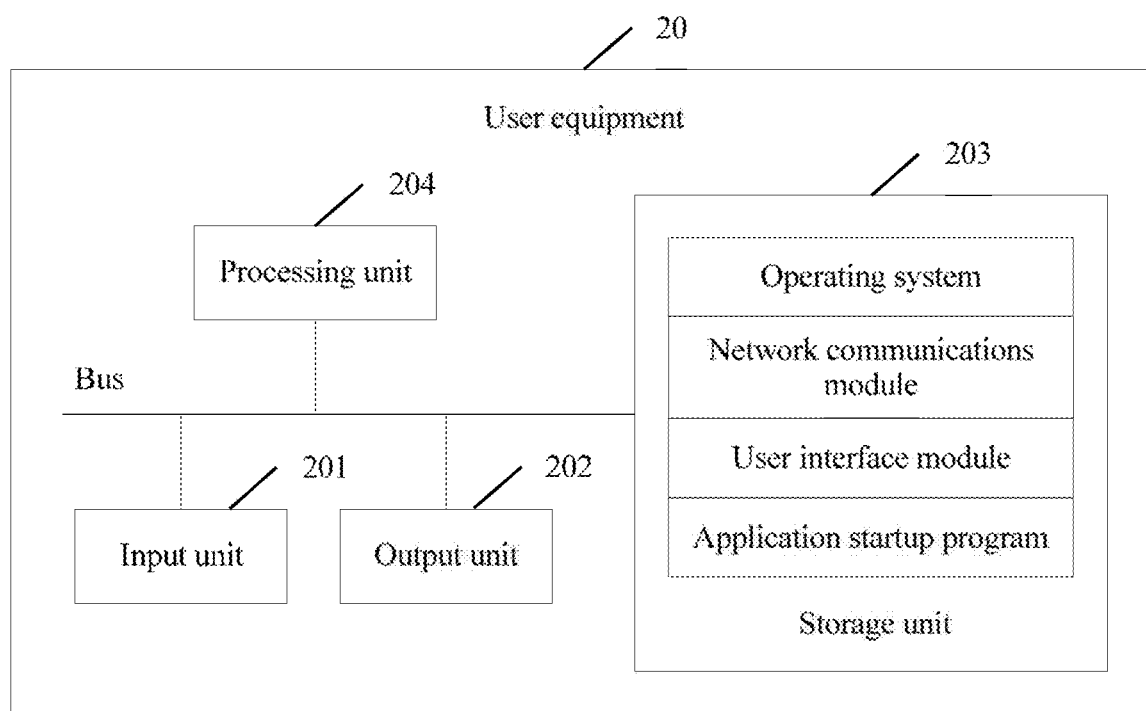
FIG. 6 is a schematic structural diagram of user equipment according to embodiments of the present invention.

Referring to FIG. 6, FIG. 6 shows user equipment (UE) 20 according to an embodiment of the present invention. The UE 20 may include an input unit 201, an output unit 202, a storage unit 203, and a processing unit 204. In some embodiments of the present invention, a bus is configured to implement a communication connection between these components. The input unit 201 may be specifically a touch panel of a terminal, including a touchscreen, and configured to detect an operation instruction on the touch panel of the terminal. The output unit 202 may include a display of the terminal and is configured to output and display an image or data. The storage unit 203 may be a high-speed RAM or may be a non-volatile memory, for example, at least one magnetic disk memory. Optionally, the memory 203 may be at least one storage apparatus that is far away from the input unit 201. As shown in FIG. 6, the memory 203, as a computer display medium, may include an operating system, a network communications module, a user interface module, and a data processing program.

The processing unit 204 of the UE in FIG. 6 invokes program code in the storage unit 203, to perform the following operations: receiving, by using the input unit 201, a source identifier allocated by a first base station to which a first cell belongs, where the source identifier includes a first UE identifier used to uniquely identify the UE in the first base station; entering, by the UE, a low-overhead state when satisfying a preset activation condition, storing, by the UE in the low-overhead state, a connection context of the UE in a connected state, and camping on a cell according to a cell reselection criterion in a moving process; and reporting, by using the output unit 202 when a first preset condition is satisfied, the source identifier to a second base station to which a second cell belongs, where the second cell is a serving cell on which the UE currently camps.

In an optional solution, the source identifier includes a first cell identifier used to identify the first cell and the first UE identifier used to uniquely identify the UE in the first cell, and the first cell identifier includes at least one of a cell universal identifier, a physical cell identifier PCI, and a cell identifier including an identifier of a region and an identifier of the first cell in the region; or the source identifier includes a first base station identifier used to uniquely identify the first base station and the first UE identifier used to uniquely identify the UE in the first base station.

In another optional solution, the preset activation condition includes at least one of the following conditions: the UE receives, from the first base station, a control instruction used to instruct to enter the low-overhead state; the UE leaves the first cell; the UE does not transmit data with the first base station in first preset duration; a timing advance timer (TA timer) of the UE expires, or a TA timer of the UE expires and the TA timer does not rerun in second preset duration; and the UE does not exit from a discontinuous reception (DRX) state in third preset duration after entering the DRX state.

In another optional solution, the processing unit 204 is further configured to: exit, by the UE after the UE enters the low-overhead state when satisfying the preset activation condition, from the low-overhead state when a second preset condition is satisfied.

The second preset condition includes: the serving cell on which the UE currently camps changes; the serving cell on which the UE currently camps is not included in a specified cell set; the serving cell on which the UE currently camps and the first cell do not belong to a same preset region or a same base station; the UE sends the source identifier to the second base station and receives an access rejection instruction corresponding to the source identifier from the second base station; the UE reads a system information broadcast of the second cell, and the system information broadcast does not carry an instruction for permitting access by the UE in the low-overhead state; the UE enters the low-overhead state for a predefined time period, and a length of the predefined time period may be a time length specified in the UE or a time length configured by and received from the first base station; the UE needs to send uplink data; or the UE obtains a reference signal measurement result, and a comparison result between the reference signal measurement result and a predetermined first threshold complies with a preset result.

In another optional solution, that the processing unit 204 is configured to exit, by the UE, from the low-overhead state when a second preset condition is satisfied is specifically: deleting the connection context when the second preset condition is satisfied, and entering an idle state.

In another optional solution, the first preset condition includes: the serving cell on which the UE currently camps changes; the second cell on which the UE currently camps is not included in a specified cell set; the second cell on which the UE currently camps and the first cell do not belong to a same preset region or a same base station; or the UE needs to send uplink data.

In another optional solution, the processing unit 204 is further configured to: before reporting, by using the output unit 202 when the first preset condition is satisfied, the source identifier to the second base station to which the second cell belongs, receive and read, by using the input unit 201, a system information broadcast of the second cell; and if the system information broadcast carries an instruction for permitting access by the UE in the low-overhead state, determine, according to the access instruction, to send the source identifier to the second base station by using the output unit 202.

In another optional implementation, before reporting, by using the output unit 202, the source identifier to the second base station to which the second cell belongs, the processing unit 204 is configured to obtain the reference signal measurement result by using the input unit 201, compare the reference signal measurement result with a predetermined first threshold, and determine, according to the comparison result, to send the source identifier to the second base station by using the output unit 202.

In another optional solution, the processing unit 204 is further configured to: before reporting, by using the output unit 202 when the first preset condition is satisfied, the source identifier to the second base station to which the second cell belongs, send, by using the output unit 202, a random access preamble within a preset range to the second base station, where the random access preamble within the preset range is used to indicate that the source identifier needs to be sent to the second base station or that a message whose size is greater than a preset length threshold needs to be sent to the second base station; receive, by using the input unit 201, a transmission resource with a preset size that is allocated by the second base station and that is used to transmit the source identifier; and use the transmission resource and the output unit 202 to send the source identifier to the second base station.

In another optional solution, the random access preamble within the preset range is a predefined preamble or a preamble configured by and received from the second base station.

In another optional solution, that the processing unit 204 is configured to report the source identifier to a second base station to which a second cell belongs is specifically: sending, by using the output unit 202, the random access preamble to the second base station; receiving, by using the input unit 201, a dedicated UE identifier sent by the second base station and the transmission resource that is allocated according to the random access preamble and that is used to transmit the source identifier, where the dedicated UE identifier is an identifier used to uniquely identify the UE in the second cell; using the output unit 202 and the transmission resource to send the source identifier to the second base station; receiving, by using the input unit 201, acknowledgement information that is sent by the second base station and that includes the source identifier; and determining, according to the acknowledgement information, whether to apply the dedicated UE identifier.

In another optional solution, that the processing unit 204 is configured to determine, according to the acknowledgement information, whether to apply the dedicated UE identifier is specifically: skipping applying, by the processing unit 204, the dedicated UE identifier according to the acknowledgement information; applying, by the processing unit 204, the dedicated UE identifier according to the acknowledgement information, and exiting from the low-overhead state; applying, by the processing unit 204, the dedicated UE identifier according to the acknowledgement information, and remaining in the low-overhead state; or applying, by the processing unit 204 according to an instruction that is carried in the acknowledgement information and that is used to instruct the UE to exit from the low-overhead state, the dedicated UE identifier and exiting from the low-overhead state.

In another optional solution, the processing unit 204 is further configured to: after the UE applies the dedicated UE identifier, update a key in the connection context according to a cell identifier of the serving cell that is currently camped on.

In another optional solution, the source identifier further includes verification information, and the verification information is identity check information generated by the UE according to the source identifier and the updated key.

In another optional solution, the processing unit 204 is further configured to: perform paging monitoring by using the source identifier after the UE enters the low-overhead state when satisfying the preset activation condition.

In another optional solution, the processing unit 204 is further configured to: receive, by using the input unit 201, radio resource control RRC configuration information sent by the first base station, where the RRC configuration information includes an RRC configuration index, and the configuration index is used to indicate the RRC configuration information; and use, by the UE in the low-overhead state, the RRC configuration information.

In another optional solution, that the processing unit 204 is configured to report, when the first preset condition is satisfied, the source identifier to a second base station to which a second cell belongs is specifically: reporting, by using the output unit 202, the source identifier including the RRC configuration index to the second base station to which the second cell belongs, so that the second base station determines, according to the RRC configuration index, the RRC configuration information used by the UE.

In another optional solution, that the processing unit 204 is configured to report, when the first preset condition is that the UE needs to send the uplink data, the source identifier to a second base station to which a second cell belongs is specifically: reporting, by using the output unit 202, an uplink data indication including the source identifier to the second base station to which the second cell belongs.

In another optional solution, that the processing unit 204 is configured to report, when the first preset condition is that the UE needs to send the uplink data, the source identifier to a second base station to which a second cell belongs is specifically: reporting, by using the output unit 202 according to indication information of the second base station, a long source identifier or a short source identifier to the second base station to which the second cell belongs.

It may be understood that for functions of units in the user equipment (UE) 20, reference may be made to specific corresponding implementations in the foregoing method embodiment in FIG. 3A and FIG. 3B. Details are not described herein again.

Figure 7:
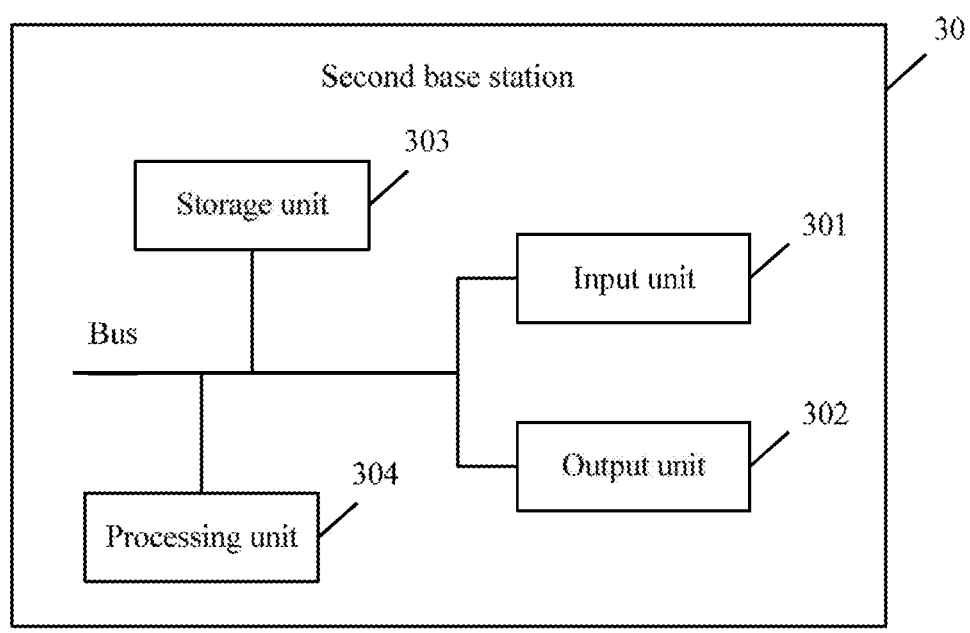
FIG. 7 is a schematic structural diagram of a second base station according to embodiments of the present invention.

Referring to FIG. 7, FIG. 7 shows a base station 30 according to an embodiment of the present invention. The base station 30 is a second base station. The base station 30 includes an input unit 301, an output unit 302, a storage unit 303, and a processing unit 304. In some embodiments of the present invention, the input unit 301, the storage unit 303, and the processing unit 304 may be connected by using a bus or in another manner. In FIG. 7, a connection by using a bus is used as an example. The processing unit 304 invokes program code in the storage unit 303, to perform the following operations: receiving, by using the input unit 301, a source identifier reported by user equipment (UE) in a low-overhead state, where the UE in the low-overhead state stores a connection context of the UE in a connected state and camps on a cell according to a cell reselection criterion in a moving process, a first cell is a serving cell of the UE when the UE enters the low-overhead state, a second cell is a current serving cell of the UE, and the source identifier includes a first UE identifier used to identify the UE in a first base station to which the first cell belongs; and sending, by using the output unit 302, the first UE identifier to the first base station according to the source identifier, to instruct the first base station to learn that the current serving cell of the UE is the second cell.

In an optional solution, the source identifier includes a first cell identifier used to identify the first cell and the first UE identifier used to uniquely identify the UE in the first cell, and the first cell identifier includes at least one of a cell universal identifier, a physical cell identifier PCI, and a cell identifier including an identifier of a region and an identifier of the first cell in the region; or the source identifier includes a first base station identifier used to uniquely identify the first base station and the first UE identifier used to uniquely identify the UE in the first base station.

In another optional solution, the source identifier further includes indication information, and the indication information is used to notify the second base station that the UE is in the low-overhead state.

In another optional solution, the processing unit 304 is further configured to: send, by using the output unit 302, a system information broadcast before receiving, by using the input unit 301, the source identifier reported by the user equipment (UE) in the low-overhead state, where the system information broadcast carries an instruction for permitting access by the UE in the low-overhead state, so that the UE determines, according to the access instruction, whether to send the source identifier to the second base station.

In another optional solution, the processing unit 304 is further configured to: before receiving, by using the input unit 301, the source identifier reported by the user equipment (UE) in the low-overhead state, receive, by using the input unit 301, a random access preamble sent by the UE; and allocate, by using the output unit 302, a transmission resource with a preset size to the UE when the random access preamble is within a preset range, so that the UE uses the transmission resource to send the source identifier.

In another optional solution, the random access preamble within the preset range is a predefined preamble or a preamble configured by and received from the second base station.

In another optional solution, that the processing unit 304 is configured to receive, by using the input unit 301, a source identifier reported by user equipment (UE) in a low-overhead state is specifically: receiving, by using the input unit 301, a random access preamble sent by the user equipment (UE) in the low-overhead state; allocating, to the UE by using the output unit 302 according to the random access preamble, a dedicated UE identifier and a transmission resource used to transmit the source identifier, where the dedicated UE identifier is an identifier used to uniquely identify the UE in the second cell; using the input unit 301 and the transmission resource to receive the source identifier; and sending, by using the output unit 302, acknowledgement information including the source identifier to the UE.

In another optional solution, that the processing unit 304 sends, by using the output unit 302, acknowledgement information including the source identifier to the UE is specifically: sending, to the UE by using the output unit 302, an acknowledgement message that includes the source identifier and that carries an instruction used to instruct the UE to exit from the low-overhead state, so that the UE applies the dedicated UE identifier and exits from the low-overhead state according to the instruction.

In another optional solution, that the processing unit 304 sends, by using the output unit 302, the first UE identifier to the first base station according to the source identifier is specifically: sending, by using the output unit 302, a notification message to the first base station according to the source identifier, where the notification message carries the source identifier of the UE and a second cell identifier of the second cell in which the UE is currently located, so that the first base station determines, according to the source identifier and the second cell identifier, that the serving cell on which the UE currently camps is the second cell.

In another optional solution, the processing unit 304 is further configured to: after sending the first UE identifier to the first base station by using the output unit 302 according to the source identifier, receive an uplink data indication that is sent by the UE and that includes the source identifier; send, by using the output unit 302, a connection context transfer request to the first base station, where the connection context is the connection context of the UE in the connected state that is stored by the first base station when the UE enters the low-overhead state, and the connection context transfer request carries the source identifier of the UE; and receive, by using the input unit 301, the connection context transferred by the first base station, and establish a connection to the UE according to the connection context.

In another optional solution, the processing unit 304 is further configured to: send, by using the output unit 302, a re-allocated source identifier to the UE after receiving, by using the input unit 301, the connection context transferred by the first base station, where the re-allocated source identifier includes a second UE identifier used to identify the UE in the second base station; and send, by using the output unit 302, an instruction to the UE, to instruct the UE to exit from the low-overhead state.

In another optional solution, the processing unit 304 is further configured to: receive, by using the input unit 302 after sending the first UE identifier to the first base station by using the output unit 302 according to the source identifier, the connection context and the source identifier of the UE that are sent by the first base station; and determine configuration information of the UE according to the received connection context and source identifier, and trigger uplink access by the UE according to the source identifier.

In another optional solution, that the processing unit 304 is configured to trigger uplink access by the UE according to the source identifier is specifically: initiating paging to the UE by using the source identifier; determining the dedicated UE identifier of the UE according to the source identifier, and sending an uplink access command to the UE by using the dedicated UE identifier; or determining the dedicated UE identifier of the UE according to the source identifier, and initiating paging to the UE by using the dedicated UE identifier.

In another optional solution, the source identifier further includes a radio resource control RRC configuration index, and the processing unit 304 is further configured to: determine, according to the RRC configuration index after receiving, by using the input unit 302, the source identifier reported by the user equipment (UE) in the low-overhead state, RRC configuration information used by the UE.

In another optional solution, that the processing unit 304 is configured to send, by using the output unit 302, the first UE identifier to the first base station according to the source identifier is specifically: sending the source identifier to the first base station according to the source identifier by using an inter-base station interface between the output unit 302 and the first base station; or sending the source identifier to the first base station according to the source identifier by using the output unit 302 and a core network.

It may be understood that for functions of units in the base station 30, reference may be made to specific corresponding implementations in the foregoing method embodiment in FIG. 4A and FIG. 4B. Details are not described herein again.

It should be noted that the foregoing method embodiments of the present invention may be applied to a processor or implemented by a processor. The processor may be an integrated circuit chip and has a signal processing capability. In an implementation process, steps of the foregoing method embodiments may be completed by using an integrated logical circuit of hardware in the processor or an instruction in a form of software. The foregoing processor may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or execute all methods, steps, and logical schematic diagrams that are disclosed in the embodiments of the present invention. The general purpose processor may be a microprocessor, or the processor may be any conventional processor or the like. The steps of the methods disclosed with reference to the embodiments of the present invention may be directly completed by a hardware decoding processor, or may be completed by using a combination of hardware and software modules in a decoding processor. The software module may be located in a mature storage medium in the field such as a random access memory, a flash memory, a read-only memory, a programmable read-only memory, an electrically erasable programmable memory, or a register. The storage medium is located in a memory. The processor reads information in the memory and completes the steps of the foregoing methods with reference to the hardware of the processor.

It may be understood that the memory in the embodiments of the present invention may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and used as an external high-speed cache. By way of example but not limitation, a large quantity of forms of RAMs are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memories in a system and the method that are described in this specification are intended to include but are not limited to these memories and any other applicable types of memories.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A mobility management method applied for a terminal, comprising:
    receiving, when the terminal in a connected state in a first cell, a message, wherein the message indicates entry of a low overhead state and includes a source identifier from a first base station to which a first cell belongs, wherein the source identifier comprises a first part identifying the terminal in the first base station and a second part identifying the first base station;
    entering the low-overhead state, wherein the low-overhead state is state in which a connection context of the terminal is stored and the terminal camps on a cell according to a cell reselection criterion during movement; and
    determining that a current selected public land mobile network (PLMN) of the terminal does not belong to an equivalent PLMN of the terminal and, in response, exiting from the low-overhead state and entering an idle state.

2. The mobility management method according to claim 1, wherein the entering to the idle state comprises:
    deleting the connection context.

3. The mobility management method according to claim 1, further comprising: sending the source identifier to a second base station.

4. The mobility management method according to claim 3, wherein the sending the source identifier to the second base station comprises:
    in response to a preset condition being satisfied, sending the source identifier to the second base station.

5. The mobility management method according to claim 4, wherein the preset condition comprises:
    a second cell area on which the terminal currently camps does not belong to a specified cell set; or
    a second cell on which the terminal currently camps and the first cell do not belong to a same preset area or a same base station; or
    the terminal needs to send uplink data.

6. An apparatus, comprising:
    at least one processor and a non-transitory memory, wherein the memory stores an execution instruction, and when the at least one processor executes the execution instruction to enable the apparatus to perform the steps of:
    receiving a message, wherein the message indicates entry of a low overhead state and includes a source identifier from a first base station to which a first cell belongs, wherein a terminal is in a connected state in the first cell, the source identifier comprises a first part identifying the terminal in the first base station and a second part identifying the first base station;
    entering the low-overhead state, wherein the low-overhead state is state in which a connection context of the terminal is stored and the terminal camps on a cell according to a cell reselection criterion during movement; and
    determining that a current selected public land mobile network (PLMN) of the terminal does not belong to an equivalent PLMN of the terminal and in response, exiting from the low-overhead state and entering an idle state.

7. The apparatus according to claim 6, wherein the entering to the idle state comprises: deleting the connection context.

8. The apparatus according to claim 6, wherein the apparatus is further configured to send the source identifier to a second base station.

9. The apparatus according to claim 8, wherein the apparatus is configured to send the source identifier to the second base station in response to a preset condition being satisfied.

10. The apparatus according to claim 9, wherein the preset condition comprises:
    a second cell area on which the terminal currently camps does not belong to a specified cell set; or
    a second cell on which the terminal currently camps and the first cell do not belong to a same preset area or a same base station; or
    the terminal needs to send uplink data.

11. A non-transitory computer-readable storage medium comprising instructions that, when executed, cause an apparatus to implement the following operations:
    receiving a message, wherein the message indicates entry of a low overhead state and includes a source identifier from a first base station to which a first cell belongs, wherein a terminal is in a connected state in the first cell, the source identifier comprises a first part identifying the terminal in the first base station and a second part identifying the first base station;
    entering the low-overhead state, wherein the low-overhead state is state in which a connection context of the terminal is stored and the terminal camps on a cell according to a cell reselection criterion during movement; and
    determining that a current selected public land mobile network (PLMN) of the terminal does not belong to an equivalent PLMN of the terminal and, in response, exiting from the low-overhead state and entering an idle state.

12. The non-transitory computer-readable storage medium according to claim 11, wherein the entering to the idle state comprises: deleting the connection context.

13. The non-transitory computer-readable storage medium according to claim 11, further comprising instructions cause the apparatus to receive control instruction indicating to enter the low-overhead state.

14. The non-transitory computer-readable storage medium according to claim 11, further comprising instructions cause the apparatus to send the source identifier to a second base station.

15. The non-transitory computer-readable storage medium according to claim 14, further comprising instructions cause the apparatus to send the source identifier to the second base station in response to a preset condition being satisfied.

16. The non-transitory computer-readable storage medium according to claim 15, wherein the preset condition comprises:
    a second cell area on which the terminal currently camps does not belong to a specified cell set; or a second cell on which the terminal currently camps and the first cell do not belong to a same preset area or a same base station; or the terminal needs to send uplink data.

* * * * *